United States Patent [19]

Hinton et al.

[11] Patent Number: 4,764,889

[45] Date of Patent: Aug. 16, 1988

[54] OPTICAL LOGIC ARRANGEMENT WITH SELF ELECTRO-OPTIC EFFECT DEVICES

[75] Inventors: Harvard S. Hinton, Naperville, Ill.; David A. B. Miller, Fairhaven, N.J.

[73] Assignee: American Telephone and Telegraph Company, AT&T Bell Laboratories, Murray Hill, N.J.

[21] Appl. No.: 683,711

[22] Filed: Dec. 19, 1984

[51] Int. Cl.$^4$ .............................................. G06G 9/00
[52] U.S. Cl. .................................. 364/807; 364/713; 364/837; 350/3.72
[58] Field of Search .............. 364/307, 837, 822, 826, 364/827, 713; 350/3.6, 3.67, 3.72, 3.73; 357/16

[56] References Cited

U.S. PATENT DOCUMENTS

| | | | |
|---|---|---|---|
| 3,530,442 | 9/1970 | Collier et al. | 340/173 |
| 3,614,192 | 10/1971 | Preston, Jr. | 350/3.73 |
| 3,651,485 | 3/1972 | McDonnell | 340/172.5 |
| 3,807,829 | 4/1974 | Close | 350/3.72 |
| 3,975,082 | 8/1976 | Winzer | 350/96 C |
| 4,024,513 | 5/1977 | Huignard et al. | 340/173 LT |
| 4,074,361 | 2/1978 | Clow | 364/713 |
| 4,082,431 | 4/1978 | Ward, III | 364/827 X |
| 4,084,880 | 4/1978 | Clow | 364/837 X |
| 4,318,581 | 3/1982 | Guest et al. | 364/713 |
| 4,386,414 | 5/1983 | Case | 364/826 |
| 4,503,447 | 3/1985 | Iafrate et al. | 357/16 |

FOREIGN PATENT DOCUMENTS

| | | |
|---|---|---|
| 0083520 | 7/1983 | European Pat. Off. . |
| 0155802 | 9/1985 | European Pat. Off. . |

OTHER PUBLICATIONS

A. A. Sawchuck et al., "Nonlinear Real-Time Optical Signal Processing", Univ. of Southern California US-CIPI Technical Report 1100, Dec. 1, 1983, pp. 16-25, 51-56.

J. W. Goodman et al., "Optical Interconnections for VLSI Systems", Proceedings of the IEEE, vol. 72, No. 7, Jul. 1984, pp. 860-863.

A. A. Sawchuck et al., "Digital Optical Computing", Proceedings of the IEEE, vol. 72, No. 7, Jul. 1984, pp. 770-776.

D. A. B. Miller et al., "Novel Hybrid Optically Bistable Switch: The Quantum Well Self-Electro-Optic Effect Device", *Applied Physics Letters,* vol. 45, No. 1, Jul. 1, 1984, pp. 13-15.

Max Schindler, "Holographic 'Backplane' Aims to Swell Throughput of Multiprocessors", *Electronic Design,* vol. 32, No. 20, Oct. 1984, p. 93E.

A. Huang, "Design for an Optical General Purpose Digital Computer", *Proceedings of the SPIE,* vol. 232, International Optical Computing Conference, 1980, pp. 119-127.

(List continued on next page.)

*Primary Examiner*—Gary V. Harkcom
*Attorney, Agent, or Firm*—Richard J. Godlewski

[57] ABSTRACT

An arrangement for performing an optical logic operation. The optical logic arrangement comprises a plurality (100) of reflection holograms (101-109) positioned in a two-dimensional array for optically interconnecting a similar plurality (120) of optically nonlinear self electro-optic effect devices (121-129) also positioned in a two-dimensional array. Each self electro-optic effect device is responsive to control light beams received on either side of the device array for emitting an output light beam that is a nonlinear function of the control light beams. Accordingly, each self electro-optic effect device can regenerate light beams and perform an optical logic function. In response to an output light beam from a specified self electro-optic effect logic element, the associated reflection hologram originates an individual control light beam to one or more designated self electro-optic effect logic elements in the logic array. Consequently, the self electro-optic effect logic elements may be optically interconnected to perform a combination of sequential and combinational logic operations including those, for example, of an optical digital processor.

29 Claims, 12 Drawing Sheets

OTHER PUBLICATIONS

A. Huang, "Architectural Considerations Involved in the Design of an Optical Digital Computer", *Proceedings of the IEEE*, vol. 72, No. 7, Jul. 1984, pp. 780–786.

Fatehi et al., "Optical Flip-flops and Sequential Logic Circuits Using a Liquid Crystal Light Valve", *Applied Optics*, vol. 23, No. 13, Jul. 1, 1984, pp. 2163–2171.

D. A. B. Miller et al., "Optical-Level Shifter and Self-Linearized Optical Modulator Using a Quantum-Well Self-Electro-Optic Effect Device", *Optics Letters*, vol. 9, No. 12, Dec. 1984, pp. 567–569.

E. A. Mnatsakanyan et al., "Digital Data Processing in Optoelectronic Devices (Review)", *Soviet Journal of Quantum Electronics*, vol. 9, No. 6, Jun. 1979, pp. 665–677.

*Patent Abstracts of Japan*, vol. 9, No. 101, May 2, 1985, p. 353 (1824).

R. Kowarschik, "Diffraction Efficiency of Sequentially Stored Gratings in Reflection Volume Holograms", *Optical and Quantum Electronics*, vol. 10, 1978, pp. 171–178.

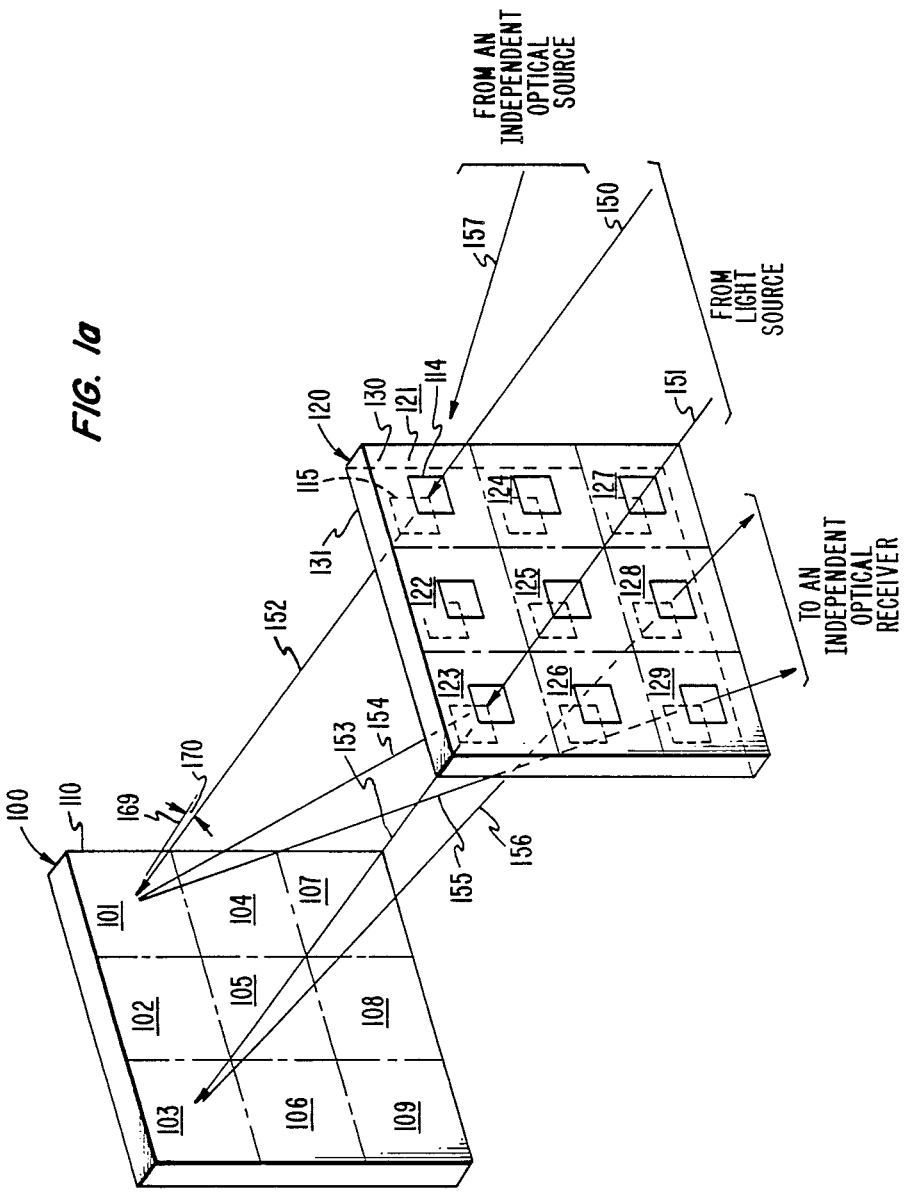

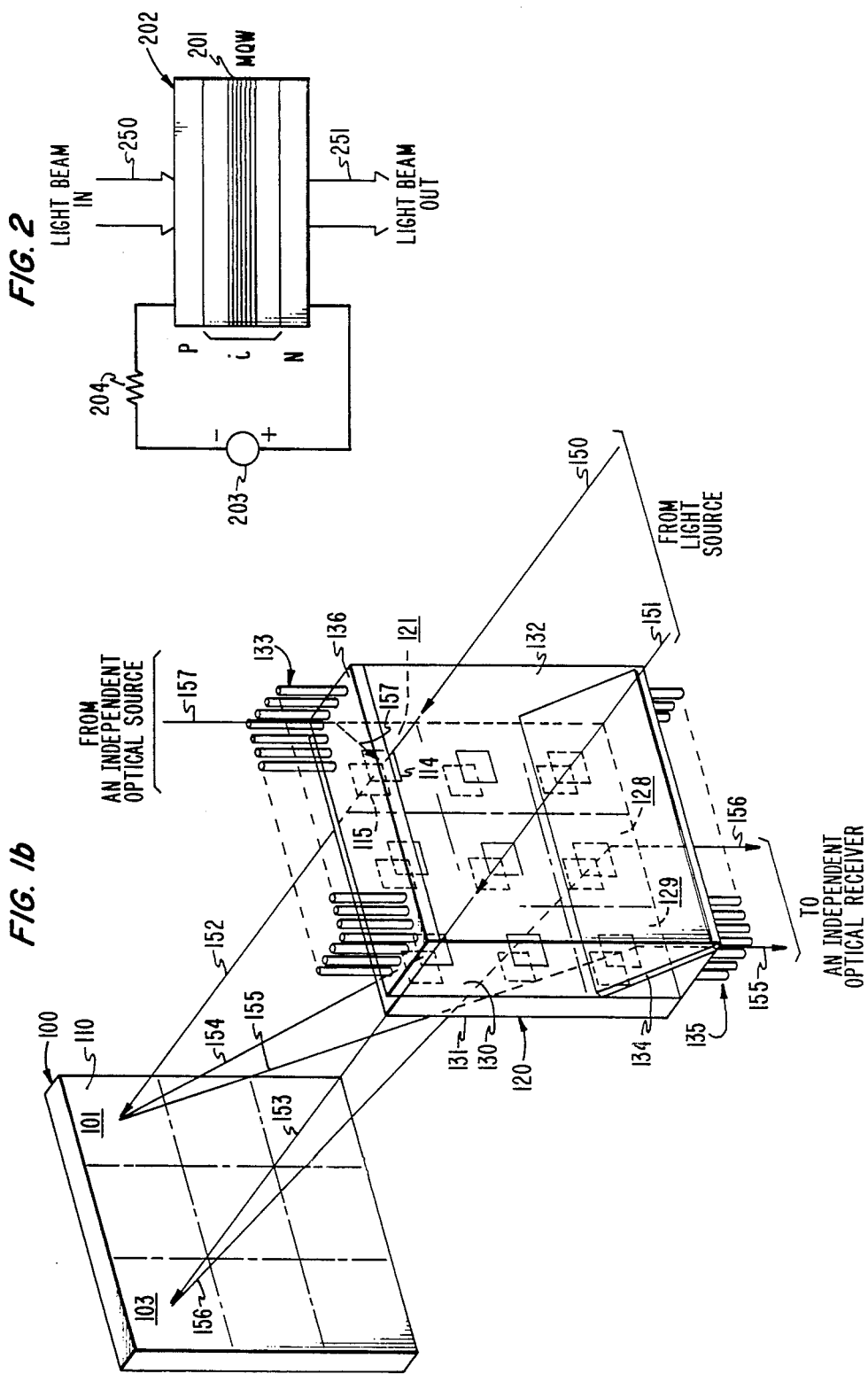

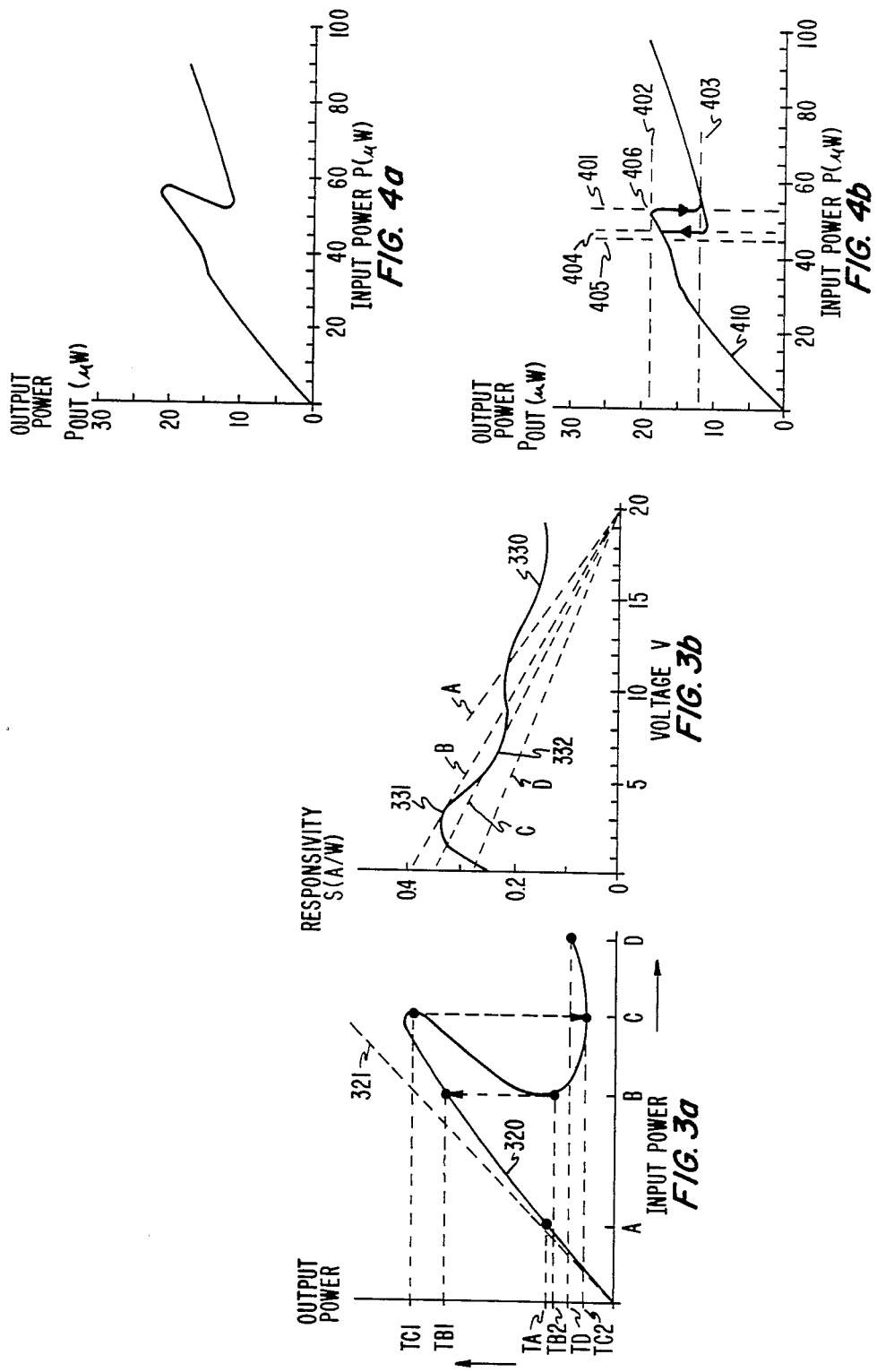

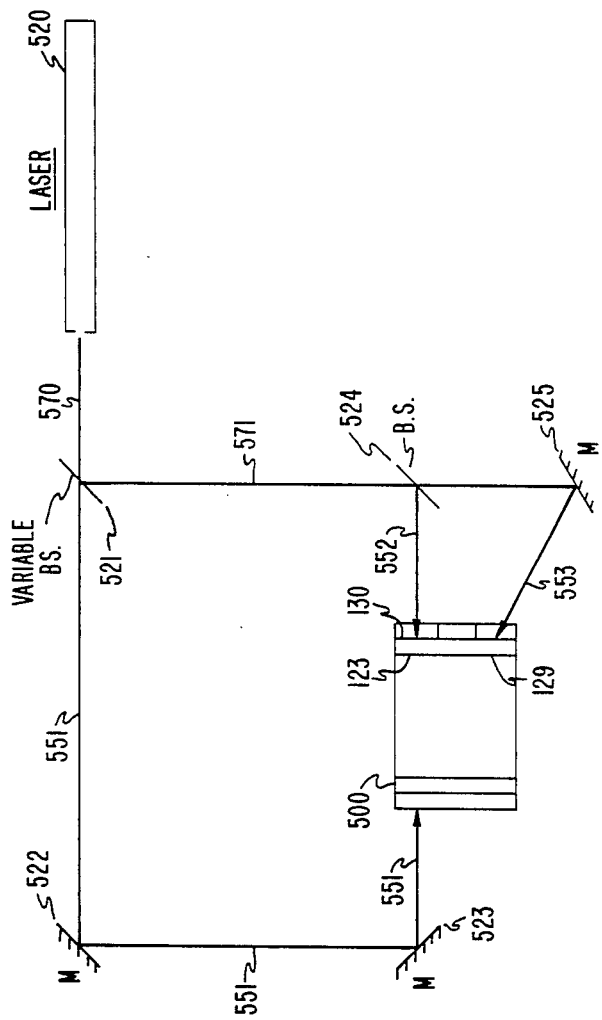

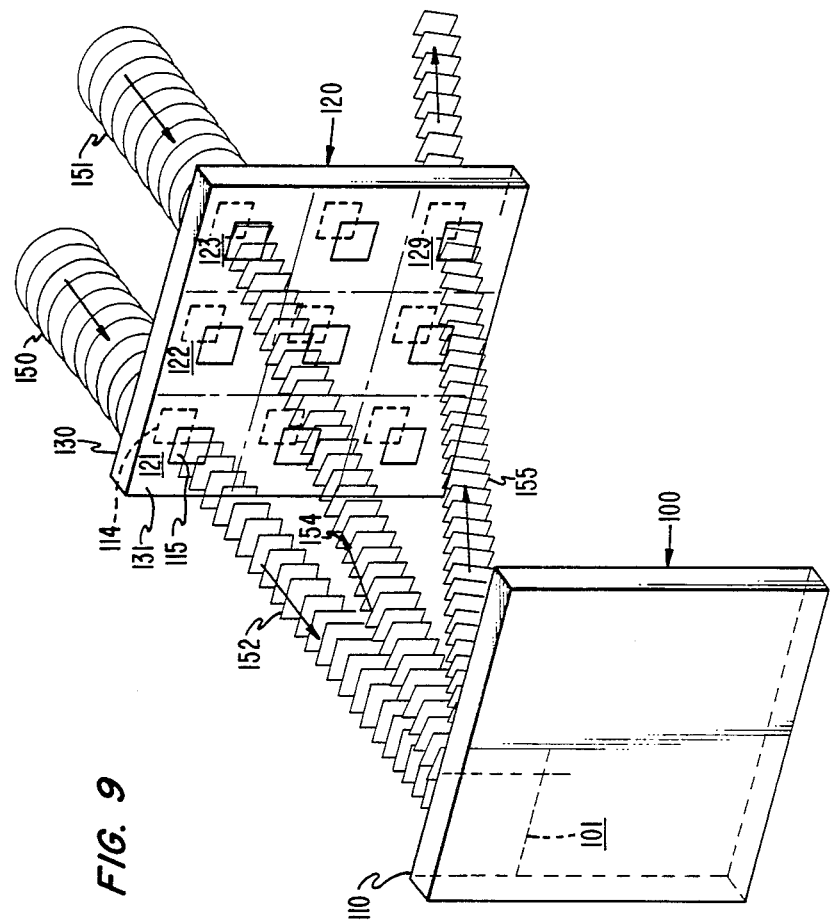

OPTICAL LOGIC ARRANGEMENT WITH SELF ELECTRO-OPTIC EFFECT DEVICES

CROSS-REFERENCE TO RELATED APPLICATION

This application is related to the applications of H. S. Hinton et al., entitled "Optical Logic Arrangement", Ser. No. 683,713; H. S. Hinton et al., entitled "Optical Interconnection Arrangement", Ser. No. 683,716 now U.S. Pat. No. 4,705,344 and H. S. Hinton et al., entitled "Method and Apparatus for Making a Device for Optically Interconnecting Optical Devices", Ser. No. 683,712 now U.S. Pat. No. 4,703,993, all filed concurrently with this application on Dec. 19, 1984.

TECHNICAL FIELD

This invention relates generally to optical logic arrangements and, more particularly, to an optical logic arrangement having self electro-optic effect devices for performing an optical logic operation.

BACKGROUND OF THE INVENTION

A vast number of prior art logic circuits employ optical devices to perform optical logic functions and operations. However, many of these circuits involve converting logic level signals between the optical domain and another domain such as the electrical domain. This optical conversion process limits the bandwidth of the optical signals, requires additional processing time, and commonly requires additional circuitry. Generally, the output signal of a nonlinear optical device is a nonlinear gain function of an input signal applied to the device where either the input or the output signal is in the optical domain. In the more specific case of an optically nonlinear optical device, the input and the output signals are both in the optical domain. Consequently, optically nonlinear optical devices can regenerate optical signals and perform optical logic functions such as the optical logic NOR, OR, NAND, and the like. However, optically nonlinear optical devices that employ an optical conversion process still have the aforementioned problems.

With the use of parallel processing techniques, it is often desirable to connect in a parallel manner the optical output of each optical logic element in one array to the optical input of each optical logic element in another array. As a result, the number of individual physical connections using, for example, optical fibers between the two arrays can be enormous with the total equaling the mathematical product of the number of elements in one array times the number of elements in the other array. Depending on the physical size of the elements as well as the interconnections, space considerations can rapidly become a factor limiting the number of connections between two arrays. This is just one reason why optical parallel processing techniques have had such limited acceptance and use.

Another prior art approach for interconnecting optical logic elements uses a computer-generated transmission hologram. Generally, a hologram consists of any material for storing the optical wavefront from an object that is encoded in an optical fringe pattern for subsequent recreation of the wavefront. One familiar example of a hologram for creating artistic visual effects is a photographic plate that has been exposed to the coherent light from a three-dimensional object and a reference beam interfering in the plate. After the photographic plate is developed, the reference beam is again passed through the developed photographic plate to recreate a three-dimensional image of the object.

One example of an optical sequential logic system utilizing computer-generated transmission holograms for optically interconnecting the optical logic elements of the system is described by A. A. Sawchuk et al. in Technical Report No. 1100 entitled "Nonlinear Real-Time Optical Signal Processing", University of Southern California Image Processing Institute, Los Angeles, Calif., 1983. The optical logic system includes an array of computer-generated Fourier transmission holograms for optically interconnecting a similar array of liquid crystal light valves. The light valves are optically nonlinear optical devices and are operated to regenerate optical signals and to perform an optical logic NOR function. However, one disadvantage of the liquid crystal light valve is that the optical input control signals are received on one surface of the device and that the optical output signals are emitted from another surface usually on the other side of the device. Thus, the transmission holograms and a complicated arrangement of precisely positioned lenses and mirrors must direct the optical output signals from the rear surface of the light valve array 360 degrees onto the front surface of the light valve array. The long distance that optical output signals must travel from the rear surface of a light valve before being reflected as an intput control signal onto the front surface of at least one other light valve, severely limits the operating speed of any optical system using this transmission hologram interconnection arrangement. Another problem with this interconnection arrangement is the mechanical precision required in aligning the transmission holograms and the light valves with the mirrors and the lenses. A slight vibration can misalign the entire system.

Another disadvantage of the liquid crystal light valve is its relatively slow switching speed. Faster speed nonlinear Fabry-Perot Interferometers are possible substitutes for the liquid crystal light valves. However, with faster switching speeds, proportional amounts of additional power are required to operate the device.

Another problem with Fourier transmission holograms is the significant power loss of an optical signal as it passes through the hologram. Each optical signal passing through a Fourier transmission hologram forms two images of which only one is used to interconnect the light valves and has at most half the optical power of the incident signal. Furthermore, transmission holograms operate only with coherent light which may result in optical interference at the input of a optical logic element due to constructive and destructive interference between several input signals.

SUMMARY OF THE INVENTION

The foregoing problems of transmission hologram optical logic arrangements with liquid crystal light valves or nonlinear interferometers are solved and a technical advance is achieved by an optical logic arrangement comprising self electro-optic effect devices optically interconnected by a reflection hologram. Each device is responsive to a control light beam for emitting an output light beam. In response to interconnecting output light beam from one self electro-optic effect device, the reflection hologram originates an interconnecting control light beam to another self electro-optic effect device. The reflection hologram can also be made to originate individual interconnecting control light beams to two or more self electro-optic effect devices in response to an interconnecting output light beam from one device.

Advantageously, with each self electro-optic effect device operated to perform an optical logic function, a plurality of these low-power, high-speed self electro-optic effect devices may be optically interconnected to form an optical logic circuit or to perform an optical logic operation.

In one illustrative embodiment of this invention, the reflection hologram originates an interconnecting control light beam to a designated self electro-optic effect device by reflecting a predetermined amount of the interconnecting output light beam from a specified self electro-optic effect device to the designated device.

In another illustrative embodiment of this invention, a plurality of reflection holograms positioned in a two-dimensional array optically interconnects a plurality of self electro-optic effect devices to form a two-by-two optical crossbar switch. Each device is operated to function as optical logic NOR gate.

In accordance with one feature of this invention, each self electro-optic effect device is responsive to control light beams incident on either surface of the two-dimensional device array for emitting an interconnecting output light beam to a specified reflection hologram.

Advantageously, without the use of mirrors or lenses, each reflection hologram directly reflects the interconnecting output light beam from a specified self electro-optic effect logic element to at least one other self electro-optic effect logic element to form the optical crossbar switch. Since cumbersome arrangements of mirrors or lenses are not required, optical logic systems and optical signal processing can be simplified substantially. Furthermore, the self electro-optic effect logic elements may be optically interconnected in a relatively small space. Since intersecting light beams do not interfere with one another, the self electro-optic effect logic arrangement significantly enhances the practical use of optical parallel processing techniques.

In accordance with another advantage of this invention, the optically nonlinear self electro-optic effect devices of this invention can switch at a higher speed than a liquid crystal light valve and at low switching power levels. Thus, this optical logic arrangement is ideally suited for use with low optical power light sources. Furthermore, the use of the self electro-optic effect devices of this invention also minimizes the generation of undesired heat at high switching speeds normally associated with high speed optical devices.

In accordance with another feature of this invention, the reflection holograms can be made to feed back any number of interconnecting light beams to form a sequential optical logic circuit.

Another advantage of this invention is that the reflection hologram functions with either coherent light or incoherent light from inexpensive low-power light sources. This significantly reduces the cost of an optical logic system as compared to a transmission hologram optical logic system that uses only coherent light from normally higher cost laser light sources.

In accordance with still another feature, the arrangement further comprises director means such as a rainbow transmission hologram and a planar mirror for directing control light beams between the optical logic element array and other optical sources and receivers.

In accordance with yet another feature of this invention, with the use of optically nonlinear self electro-optic effect devices that receive optical control signals on either side of a device array, combinational and sequential optical logic circuits can easily be interconnected in a relatively small space to form even larger and more complex optical logic circuits and systems such as an optical digital processor.

BRIEF DESCRIPTION OF THE DRAWING

The invention may be better understood from the following detailed description when read with reference to the drawing in which:

FIG. 1a depicts an illustrative arrangement having a plurality of reflection holograms and optically nonlinear optical devices for performing an optical logic operation;

FIG. 1b shows the illustrative arrangement of FIG. 1a with a rainbow transmission hologram and a planar mirror for directing external optical signals to and from the device array, respectively;

FIG. 2 depicts a diagram of an illustrative optically nonlinear optical device known as the self electro-optic effect device (SEED) that may be operated to function as an optical logic NOR gate;

FIG. 3a graphically depicts the theoretical output power of the SEED of FIG. 2 as a function of optical input power in the bistable region of the device;

FIG. 3b graphically depicts the empirical responsivity S(V) of an exemplary diode structure that may be used for the SEED of FIG. 2;

FIG. 4a graphically depicts the entire theoretical input-output power characteristics of the SEED of FIG. 2;

FIG. 4b graphically depicts the empirical input-output power characteristics and bistable switching operation of a sample SEED;

FIG. 5b depicts an illustrative arrangement for generating and directing coherent light beams to form the optical fringe patterns of FIG. 5a;

FIG. 9 depicts a rear pictorial view of the illustrative interconnection arrangement of FIG. 1a showing selected optical signals as plane waves;

DETAILED DESCRIPTION

Figure 5A:
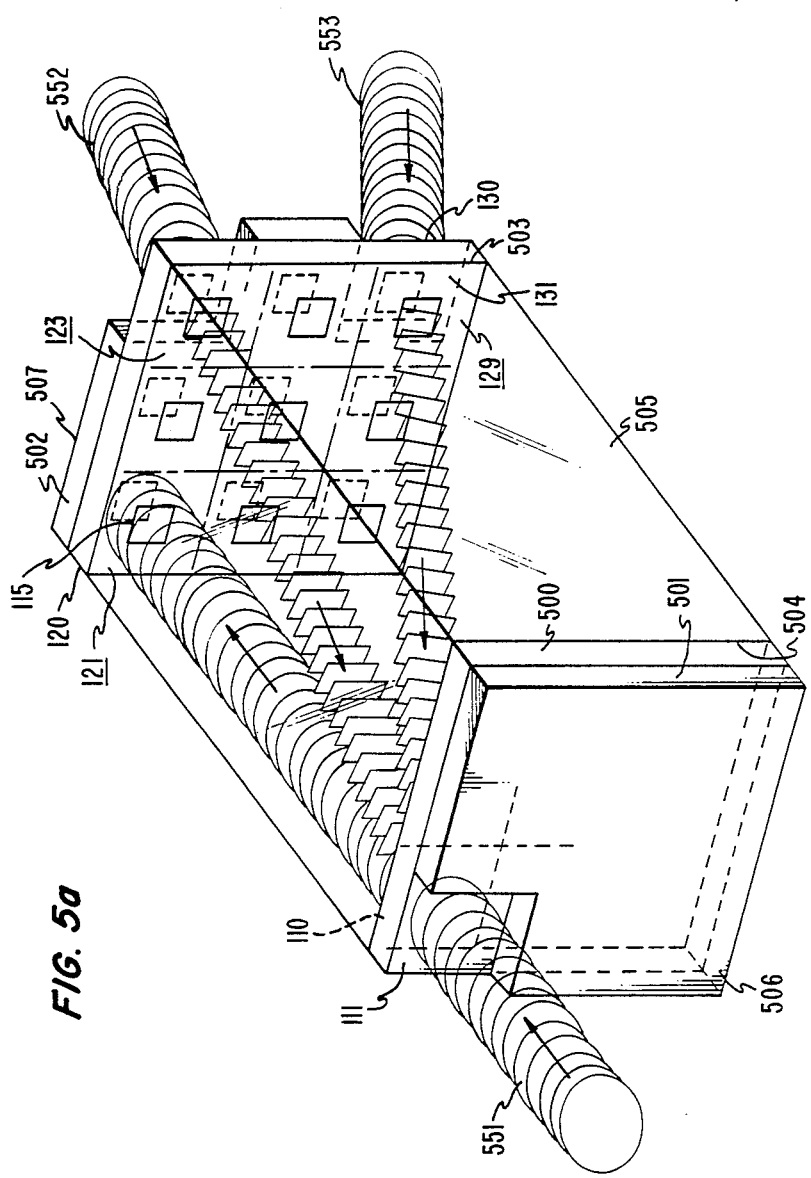
FIG. 5a depicts an illustrative arrangement for forming optical fringe patterns in a photographic emulsion to optically interconnect an array of optically nonlinear optical devices.

Depicted in FIG. 1a is an illustrative arrangement for performing an optical logic operation. The optical logic arrangement comprises a reflection hologram 100 or, more particularly, a plurality of reflection subholograms 101 through 109 positioned in a two-dimensional array for optically interconnecting a plurality 120 of optically nonlinear devices 121 through 129 also positioned in a two-dimensional array. As known in the art, the optical output signal of an optically nonlinear optical device is a nonlinear gain function of at least one optical input signal applied to the device. Consequently, an optically nonlinear optical device can regenerate optical signals and perform optical logic functions. Bias light beams 150 and 151 optically bias respective optically nonlinear devices 121 and 123 in a well-known manner to function as optical logic elements such as optical NOR gates. In response to an interconnecting optical output signal such as interconnecting output light beam 152 received in a predetermined direction from the rear surface 131 of a specified device such as 121, the correspondingly positioned subhologram such as 101 originates one or more individual interconnecting control light beams such as 154 and 155 each in a different predetermined direction back to the rear surface of one or more other devices such as 123 and 129 in the device array. To optically interconnect three or more optical devices such as 121, 123, and 128 in series, the position of each emitting device such as 121 and 123 is maintained in a fixed position relative to its correspondingly positioned subhologram such as 101 and 103, respectively. Otherwise, two optically interconnected devices need only be positioned in a fixed direction from the correspondingly positioned subhologram. Optically nonlinear devices 121 through 129 have front and rear surfaces 130 and 131 for receiving optical signals propagating in either one of two generally opposing directions. Thus, a plurality of holograms such as subholograms 101 through 109 can be made to interconnect these two-surfaced optically nonlinear devices to form any combinational or sequential optical logic circuit.

As suggested, each optically nonlinear optical device in plurality 120 is responsive to light beams received on either one or both of front and rear surfaces 130 and 131 for emitting an interconnecting output light beam from one of the two surfaces. The wavelength of these optical signals or light beams can range from the ultraviolet to the infrared. Several devices such as the nonlinear Fabry-Perot Interferometer and the self electro-optic effect device (hereinafter referred to as SEED) that will be described hereinafter are suitable for use as the optically nonlinear optical device. In addition, each of these devices may be operated to function as an optical logic element such as an optical NOR gate.

Each optically nonlinear device in plurality 120 is in either one of two transmission states depending on the power of the incident light. When the power of an incident light beam is below a predetermined threshold level, the device is in a first transmission state and simply passes or, more particularly, receives the incident light beam and emits an output light beam. For example, a source of either coherent or incoherent light (not shown) illuminates the front surface 130 of plurality 120 with optical bias signals such as bias light beams 150 and 151. The bias beams cause respective devices 121 and 123 to function as optical logic NOR gates. When the power of bias beam 150 is just below the threshold level of NOR gate 121, the gate passes bias beam 150 as a high logic level output light beam 152 to reflection subhologram 101. Similarly, NOR gate 123 passes bias light beam 151 as a high logic level output light beam 153 to reflection subhologram 103.

In contrast to transmission holograms, reflection holograms reflect, rather than pass, optical signals. In response to interconnecting output beam 152, reflection subhologram 101 originates interconnecting control light beams 154 and 155 to respective devices 123 and 129. Macroscopically, reflection subhologram 101 originates interconnecting control beams 154 and 155 by splitting and reflecting output beam 152. As a result, reflection subhologram 101 optically connects nonlinear optical device 121 to devices 123 and 129. Since the front surface 110 of reflection subhologram 101 and the rear surface 131 of device 121 are positioned in a substantially parallel manner directly facing each other, subhologram 101 receives interconnecting output beam 152 in a direction having a zero degree angle of incidence 170 with respect to the normal 169 of front surface 110. The direction of interconnecting output light beam 152 would change, and the incident angle would, of course, increase if the two opposing surfaces of subhologram 101 and device 121 were either not parallel or did not directly face each other.

A reflection hologram can originate any number of interconnecting control light beams and originate each one in a different direction. Thus, as illustrated, control light beams 154 and 155 propagate in different directions to respective devices 123 and 129 and in a direction generally opposite to that of interconnecting output beam 152. The total optical power of the reflected interconnecting control beams 154 and 155 will, of course, be somewhat less than the power of the interconnecting output light beam 152.

Similarly, reflection subhologram 103 reflects interconnecting output beam 153 received from optical NOR gate 123 as interconnecting control beam 156 to optically nonlinear device 128. Without a bias beam incident on optically nonlinear devices 128 and 129, a low-power level interconnecting control beam normally passes straight through the device.

When bias beam 151 and high logic level interconnecting control beam 154 are both incident on NOR gate 123, the power of the incident light beams exceeds the predetermined threshold level of the device and causes the device to assume a second transmission state. In this second state, the device either absorbs a significant portion of the incident light or reflects the incident light depending on the type of device used. As a result, interconnecting output beam 153 from NOR gate 123 and reflected interconnecting control beam 156 from reflection subhologram 103 assume a low logic level.

In addition, optical control signals other than those from hologram 100 such as a high logic level control beam from an independent optical source such as another optical logic circuit (not shown) may be used to control the state of any device in the array. For instance, a plurality of optical control signals transmitted via a fiber optic bundle can be individually directed to specific array devices by, for example, a well-known rainbow transmission hologram. To further illustrate this point, FIG. 1b shows another view of the illustrative optical interconnection arrangement of FIG. 1a with rainbow transmission hologram 136 for directing control beam 157 from an independent optical control source to optically nonlinear device 121.

Well-known rainbow transmission hologram 136 is maintained in a position perpendicular to surface 130 of device array 120 by any suitable transparent material 132 such as silicon glass or sapphire. The transparent material maintains the rainbow hologram and device array in a fixed perpendicular position and readily passes bias beam 150 and control beam 157 to reach optical receiving and emitting area 114 of device 121. One of the fibers in bundle 133, which is attached to the rainbow hologram in a suitable manner, guides the control beam from the independent optical control source to the rainbow hologram. Rainbow hologram 136 then redirects or, more particularly, passes the control beam therethrough to device 121. By way of example, when high logic level control beam 157 and optical bias beam 150 are both incident on front surface 130 of the array, device 121 absorbs the incident light, and interconnecting output beam 152 along with associated interconnecting control beams 154 and 155 assume a low logic level. Again, depending on the type of optical device used, a low logic level optical signal may be either the absence of light or an optical signal significantly attenuated with respect to a high logic level optical signal.

Control light beams from the device array to an independent optical receiver are emitted by, again, simply passing a control beam from a reflection subhologram through an optically nonlinear device in the array when a bias beam is not incident on the device. As shown, optically nonlinear device 129 passes interconnecting control beam 155 from reflection subhologram 101 to an independent optical receiver such as another optical logic circuit. Likewise, optically nonlinear device 128 passes interconnecting control beam 156 from reflection subhologram 103 to the independent receiver. In addition, light beams from the array may be directed to the independent optical receiver by the use of a planar mirror 134 and another optical fiber bundle 135 a shown in FIG. 1b. The transparent material positions and maintains the mirror with respect to nonlinear devices 128 and 129 so that it directs or, more particularly, reflects each of light beams 155 and 156 to a particular fiber in the bundle. The bundle is, again, affixed to the transparent material in a suitable manner.

Only a single line was utilized in FIG. 1a and 1b to depict each of light beams 150 through 157. However, each optical signal approximates a plane wave or, more particularly, either a very slightly diverging or converging spherical wave, depending on the direction in which the wave is traveling with respect to the device. Depicted in FIG. 9 is a rear pictorial view of the interconnection arrangement of FIG. 1a illustrating each one of light beams 150–152, 154 and 155 as a plane wave. Recall that reflection subhologram 101 optically interconnects optically nonlinear devices 121, 123, and 129.

In this illustrative embodiment, the optical receiving and emitting areas of each optically nonlinear device have been formed into a rectangle. As shown in FIG. 9, when cylindrically-shaped bias beam 150 is received, the front surface 130 of device 121 is illuminated. Of course, only the rectangular receiving and emitting area 114 of device 121 is responsive to the cylindrically-shaped bias beam 150. When emitted from the rectangular receiving and emitting area 115 of rear surface 131 of device 121, interconnecting output beam 152 approximates a rectangular-shaped plane wave that diverges slightly in a well-known manner to illuminate a predetermined area of front surface 110 of reflection subhologram 101. In response to output beam 152, subhologram 101 originates rectangularly-shaped interconnecting control beams 154 and 155 that converge slightly on optically nonlinear devices 123 and 129, respectively. Interconnecting control beams 154 and 155 converge in the opposite manner that the coherent light beams previously diverged from devices 123 and 129 in forming subhologram 101. This divergence is similar to that of interconnecting output light beam 152. Reflection subhologram 101 reflects interconnecting control beams 154 and 155 from the same area of front surface 110.

Since a reflection hologram can be made to reflect an optical signal in any one or more of a plurality of predetermined directions, reflection hologram 100 can be made to optically interconnect the devices of the array in any desired combination. Furthermore, since only logic NOR gates are needed to form any combinational or sequential logic circuit or any combination thereof, the reflection hologram may be made to optically interconnect an array of optical logic NOR gates to form any desired combinational or sequential optical logic circuit that utilizes all optical information signals. Not only does this optical interconnection arrangement facilitate serial data processing but, in addition, facilitates parallel processing in which large numbers of parallel-connected optical logic elements may be accessed at the same time.

Depicted in FIG. 2 is a diagram of one illustrative optically nonlinear optical device, which may be used for devices 121 through 129, comprising a multiquantum well (MQW) structure known as a self electro-optic effect device (SEED). The SEED functions as a modulator and photodetector and may be operated to function as an logic element such as an optical logic NOR gate. The SEED requires very little switching energy with respect to other bistable devices such as the nonlinear Fabry-Perot Interferometer, which may also be used for devices 121 through 129. Empirically, the optical switching energy of the SEED was found to be approximately 4 femtojoules/square micron, and the total switching energy including electrical energy was found to be approximately 20 femtojoules/square micron. A SEED having a large photosensitive area of 28,000 square microns was found to have switching energy of approximately 1.0–1.5 nanojoules. SEEDs having smaller photosensitive areas will, of course, have lower switching energies and faster operation. The self electro-optic effect device is described in an article by D. A. B. Miller et al., entitled "A Novel Hybrid Optically Bistable Switch: The Quantum Well Self Electro-Optic Effect Device", *Applied Physics Letters*, Volume 44, Number 1, July 1, 1984. This device is also described by D. A. B. Miller in U.S. patent application Ser. No. 589,556 filed Mar. 14, 1984, that description being herein incorporated by reference. However, the SEED will be briefly described herein so as to enable the reader to better understand the operation of the SEED with respect to FIGS. 2 through 4b.

As shown in FIG. 2, the SEED includes a layered multi-quantum well (MQW) 201 in the intrinsic (i) region of reverse-biased positive-intrinsic-negative (p-i-n) diode structure 202. A multi-quantum well structure has a plurality of thin, narrow bandgap layers interleaved with a plurality of thin, wide bandgap layers. The narrow bandgap layers are sufficiently thin that quantum effects are evident, and important, in the carrier energy levels. With photon sources having 0.8-0.9 micron wavelengths, the layers may be comprised of well-known compounds such as AlGaAs/GaAs. However, other group 3,5 compounds such as InGaAsP and InGaAs/AlIs may be used with photo sources having 1.3-1.5 micron wavelengths. This multi-quantum well diode structure is described in detail in an article by T. H. Wood et al., entitled "High-Speed Optical Modulation with GaAs/GaAlAs Quantum Wells in a P-I-N Diode Structure", *Applied Physics Letters*, Volume 44, Number 1, Jan. 1, 1984, at page 16. When an electric field is perpendicularly applied to the layers of the structure, i.e., parallel to the small dimension of the layers, the absorption band edge including any exciton resonance peaks, can be shifted to lower photon energies. In only microns of material, changes in optical absorption of 50 percent can be readily achieved. These optical absorption changes may be used to make an optical modulator that operates at room temperature and is compatible with present laser diode powers, wavelengths, and materials. The absorption is greatly enhanced relative to the shifts seen in bulk materials because of carrier confinement in the quantum wells. AlGaAs multi-quantum wells also show exceptionally strong room-temperature exciton resonances, which enhance the absorption effects at the band edge. Furthermore, the use of a p-i-n doping scheme in this structure allows the application of a moderately large electric field to the active layers without high voltage or current drive. The p and n layers must have bandgaps so that these layers do not absorb the incident light. Applying this electric field to a reverse-biased diode structure, the structure is also an efficient photodetector.

The principles of optical absorption exhibited by the SEED are: first, that increasing the intensity of an input light beam increases the optical absorption coefficient of the device; and second, that increasing the absorption of light energy by the device also increases the optical absorption coefficient. As a consequence of these two principles, the SEED switches nonlinearly between two optical states of transmission. This will be better understood from the following description of device operation.

Constant bias voltage supply 203 and positive feedback resistor 204 are serially connected to p-i-n diode structure 202 to form the optically nonlinear self electro-optic effect device. To make the SEED switch, the incident wavelength is chosen to be near the exciton resonance position for zero voltage across the diode. With a low power level light beam 250 incident on the multi-quantum well diode structure, nearly all the voltage of constant potential 203 is applied across the diode structure, as there is very little, if any, photocurrent in the circuit.

Increasing the optical input power increases the photocurrent, thereby increasing the voltage drop across resistor 204 and reducing the voltage across the diode. This reduced voltage causes increased optical absorption as the exciton resonances move back, resulting in further increased photocurrent and consequently leading to regenerative feedback and switching.

The theoretical optical output power of the SEED of FIG. 2 under variations in power of an input light beam such as 250 is graphically shown in FIG. 3a. Note that, in the following discussion, the units of beam power are used rather than intensity. Beam power is expressed in units of watts and beam intensity in units of watts per square meter. Beam power is the integral of intensity over a cross section perpendicular to the axis of the light beam. Units of power are more useful in the following discussion because the SEED responds to beam power and, more particularly, to absorbed beam power. In FIG. 3a, the power of the input light beam is plotted along the horizontal axis. Along the vertical axis the power of the output light beam such as 251 of FIG. 2 is plotted as output power. At an input power of value A, the output power is given by a value of TA. As the input power is increased to a value of B, the output power increases to a value of TB1. However, the absorption coefficient of the SEED increases with increasing input power, and therefore the transmission curve 320 from input power A to input power B is below a line of constant slope such as straight line 321. A further increase of input power from value B to value C results in a further increase in the absorption coefficient so that the SEED becomes unstable and switches from a value of TC1 to a value of TC2. A further increase of input power to a value of D leads to an output power value of TD.

Decreasing the power of the input light beam from input power level C results in the output power tracing along curve 320 to input power B, whereupon the absorption coefficient of the SEED switches to a smaller value, and the output power increases from TB2 to the value TB1. The SEED is said to exhibit optical bistability because it switches from a state of high transmission to a state of low transmission as the optical input power is increased, and switches back to a state of high transmission as the optical input power is decreased. However, optical bistability may exist for other sequences of switching.

The empirical responsivity S(V) of an exemplary p-i-n diode structure that may be utilized for diode 202 is depicted as curve 330 in FIG. 3b. The responsivity S(V) is the photocurrent produced per unit of incident light power, and is expressed in the units of amperes per watt (A/W) of incident light power. Curve 330 shows the measured (external) responsivity S(V) of the exemplary diode structure as a function of reverse bias, this measurement being made with a laser light source tuned to a photon energy of 1.456 eV (851.7 nm). This photon energy is approximately the heavy hole resonance energy at conditions of zero bias for the MQW structure used. As the reverse bias is increased, the responsivity first increases as photocurrent collection becomes complete, and then decreases as the exciton absorption peak moves to lower energy. The "bump" between 8V and 16V in curve 330 is due to the light hole exciton resonance similarly moving past the measuring wavelength.

The input-output power characteristic of the exemplary diode structure when connected in series with a positive feedback resistor and a positive source of potential, as shown in FIG. 2, may be calculated by solving two simultaneous equations. The first equation involves the measured responsivity S(V) of the MQW diode structure as shown in FIG. 3b by curve 330 where;

$$S = S(V) \tag{1}$$

The second equation is $V = V_o - RSP$ where P is the optical input power, R is the resistance of the feedback resistor, $V_o$ is the voltage of the constant bias voltage supply, and V is the voltage across the diode. This equation may also be written as:

$$S = \frac{V_o - V}{RP}. \quad (2)$$

The graphical solution is straightforward with equation 2 giving dashed straight lines A, B, C, and D in FIG. 3b of decreasing negative slope for increasing P. Bistability results from the multiple intersections of a straight line and curve 330. Straight lines A and D intersect curve 330 only once. Straight lines B and C have tangent points 331 and 332 with curve 330. The tangent points 331 and 332 represent unstable switching points. All straight lines between lines B and C have three intersection points with curve 330, the middle intersection point representing unstable operation.

The responsivity S and voltage V across the diode may also be calculated as a function of P by choosing V, deducing S from equation 1, and P from equation 2. For reverse bias equal to or greater than 2 volts, optical absorption closely follows the responsivity. However, to make a more accurate calculation, the output power $P_{out}(\approx PT)$ for each value of diode voltage V and optical input power P can be deduced from the measured transmission T(V). Hence, the whole theoretical input-output power characteristic of a sample SEED as graphically depicted in FIG. 4a may be derived.

The empirical input-output power characteristic 410 of a sample SEED is shown in FIG. 4b. The optical output power of the device increases along curve 410 until the input power reaches predetermined input threshold level 401. At this level, the positive feedback causes the device to become unstable, and the optical output power rapidly switches from output level 402 to lower output level 403. At this lower output power level, the diode structure absorbs approximately half of the incident light. Further increasing the incident light power above input level 401 causes the output power level to again increase but at a rate less than the prior rate. Reducing the incident light power below input level 401 will accordingly decrease the output power of the device. Thus, at second predetermined input power level 404, the device once again becomes unstable, and the optical output power switches to a higher output power level on curve 410.

With this bistable optical output condition, it should be readily apparent that the self electro-optic effect device (SEED) can be optically biased to function as an optical logic NOR gate. As shown in FIG. 4b, a constant optical bias signal such as a light beam that has incident input power level 405 just below predetermined input threshold level 404 optically biases the SEED to a point below the knee 406 on input-output power characteristic curve 410. With just the bias beam incident on the device, the optical absorption of the diode structure is low, and most of the bias beam is consequently passed therethrough. When additional light such as a control light beam is incident on the device, the combined incident optical power is greater than input threshold level 401, and the optical output power of the device switches to a lower output level such as 403. Since any one of a number of optical control signals in combination with the bias signal can cause the optical output power of the device to switch to a lower transmission level, the SEED functions as an optical logic NOR gate. When all optical control signals are extinguished, only the optical bias signal is incident on the device, and the optical output signal returns to a higher output power level on the curve.

Although the sample device exhibits a hysteresis-like operation between the two stable transmission states, the hysteresis-like effect may be minimized by the use of a light source having photon energies as suggested and described in an article by D. A. B. Miller et al., entitled "Optical Bistability Due to Increasing Absorption", *Optics Letters*, Vol. 9, No. 5, May 1984, at page 162. The hysteresis-like operation is also a function of the constant bias voltage supply $V_0$ and can be also minimized by selecting $V_0$ so as to intersect the responsivity curve 330 as shown in FIG. 3b only once over the operating range of the device. In addition, it is reasonably expected that optical absorption in excess of 80 percent will be readily obtainable.

Other bistable optically nonlinear optical devices such as the nonlinear Fabry-Perot Interferometer may also be used for optically nonlinear devices 121 through 129. The nonlinear Fabry-Perot Interferometer reflects rather than absorbs incident light. Having switching speeds comparable to the SEED, the nonlinear Fabry-Perot Interferometer requires significantly higher switching power with the optical signals supplying all the power. Like the SEED, the nonlinear Fabry-Perot Interferometer may be optically biased to function as an optical logic element such as an optical NOR gate. Furthermore, the nonlinear Fabry-Perot Interferometer receives incident optical control signals on either of the two major array surfaces and emits an optical output signal from one of the same two surfaces. However as suggested, the switching power and energy of the nonlinear interferometer are considerably higher than those of the SEED. In addition, the nonlinear interferometer responds only to coherent light. A detailed description of the nonlinear Fabry-Perot Interferometer is described by D. A. B. Miller in an article entitled, "Refractive Fabry-Perot Bistability with Linear Absorption: Theory of Operation and Cavity Optimization", *IEEE Journal of Quantum Electronics*, Vol. QE-17, No. 3, March 1981. Another description of the nonlinear Fabry-Perot Interferometer for use as an optical logic element is described by J. L. Jewell, et al. in an article entitled, "Use of a Single Nonlinear Fabry-Perot Etalon as Optical Logic Gates", at page 172.

Figure 13A:
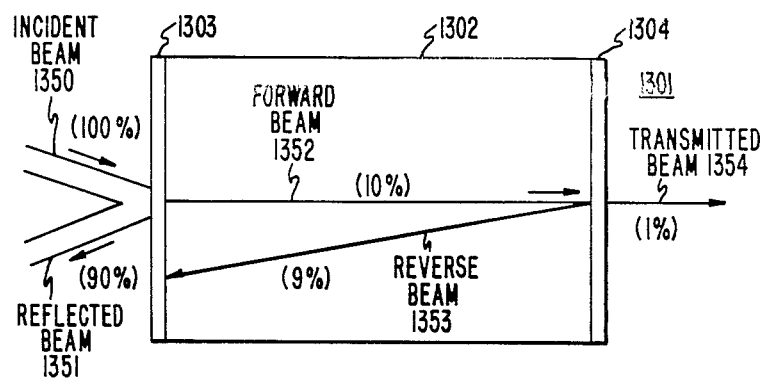
FIGS. 13a–13c illustrate the operation of a Fabry-Perot Interferometer.
Figure 13B:
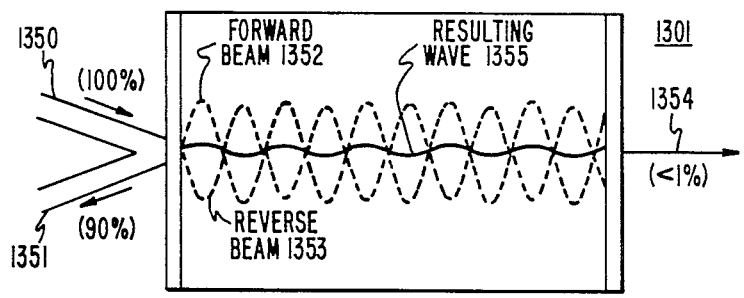
Figure 13C:
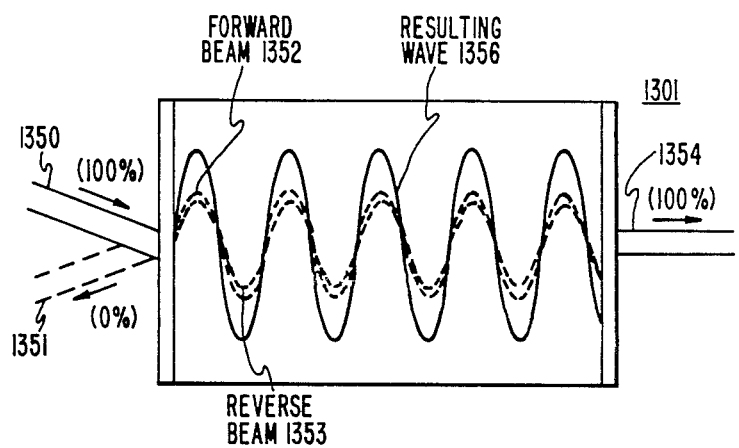

FIGS. 13a through 13c illustrate the operation of a linear Fabry-Perot Interferometer 1301. Basically, the interferometer comprises a cavity 1302 with front and rear walls 1303 and 1304. For example in the general case illustrated in FIG. 13a, 90% of incident light beam 1350 at front wall 1303 is reflected as reflected output beam 1351. The remaining 10% of the incident beam is refracted as forward beam 1352. The refracted forward beam (10%) that enters the cavity is again divided with 90% being reflected as reverse beam 1353 (9%) and 10% again being refracted as transmitted output beam 1354 (1%). In FIG. 13b, the length of the cavity is such that the forward and the reverse beams destructively interfere to form resulting wave 1355. The power of the transmitted output beam in this case is less than one percent of the incident light power. In FIG. 13c, the length of the cavity is such that the forward and the reverse beams constructively interfere to form resulting wave 1356. Here, the power of the transmitted output beam is nearly 100% of the incident light beam with little, if any, power being reflected from front wall 1303.

Figure 14A:
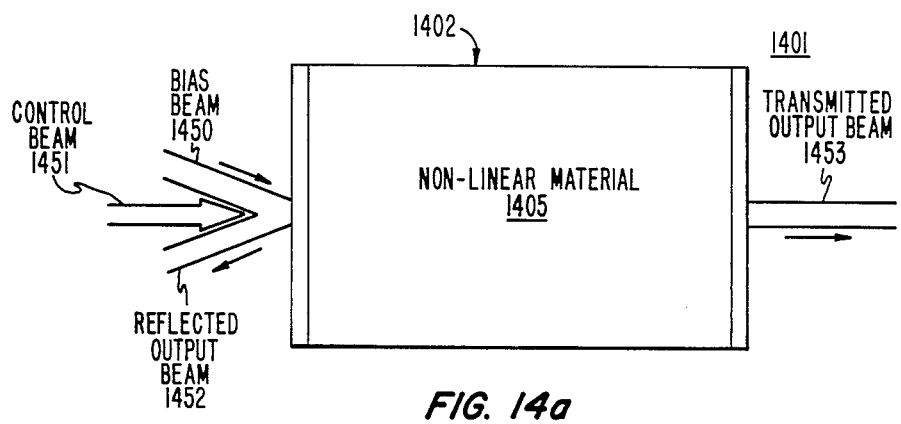
FIGS. 14a–14b illustrate the operation of a nonlinear Fabry-Perot Interferometer.

In FIG. 14a, the operation of a nonlinear Fabry-Perot Interferometer 1401 is illustrated. Here, the cavity 1402 of the interferometer is filled with a nonlinear material 1405. The index of refraction of this nonlinear material and consequently the optical path length of the material in the cavity varies as a function of the incident light power. Utilizing this property, the optical path length of the nonlinear interferometer is chosen such that little, if any, optical power is transmitted when the power of the incident light is below a threshold level. When the incident light power exceeds the threshold level, the index of refraction and the optical path length of nonlinear material 1405 change to transmit nearly 100% of the incident light power. Like the linear interferometer depicted in FIGS. 13a through 13c, there are two output beams from the nonlinear interferometer that are of interest: a reflected output beam 1452 and a transmitted output beam 1453.

Figure 14B:
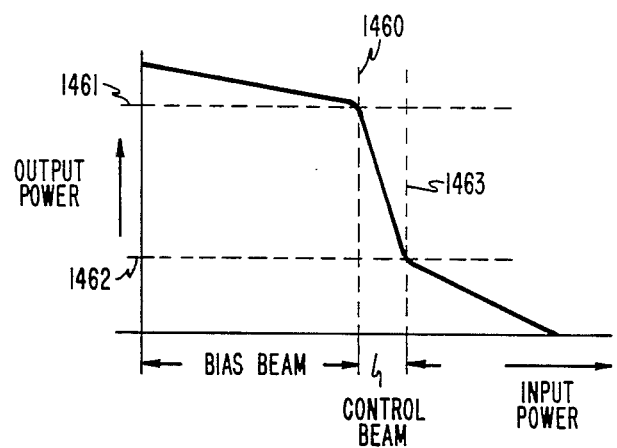

In FIG. 14b, exemplary input-output optical power curve 1410 graphically illustrates the optical output power of nonlinear interferometer 1401 as a function of the optical input power. This input-output curve will be used to illustrate how a nonlinear interferometer may be operated to perform an optical logic NOR function. Returning to consideration of FIG. 14a, an optical bias beam 1450 with input power level 1460 biases the nonlinear interferometer to a point on its input-output curve as illustrated in FIG. 14b that will cause reflected output beam 1452 to rapidly change from high logic output power level 1461 to low logic output power level 1462. The additional power to raise input power level 1460 to level 1463 is provided by high logic level control light beam 1451. When high logic input power level control beam 1451 and bias beam 1450 are incident on the interferometer, reflected output beam 1450 assumes low logic output power level 1462. When bias beam 1450 and only low logic input power level control beams are incident on the device, the reflected output beam is at high logic output power level 1461. Thus, nonlinear interferometer 1401 operates as an optical logic NOR gate. In addition, transmitted output beam 1453 may be utilized so that the nonlinear interferometer performs an optical logic OR function.

Still another optically nonlinear device is the liquid crystal light valve that can only receive optical control signals on a front surface and emit an optical output signal from the rear surface. Such a device could be used to implement the present invention. However, appropriate apparatus would have to be positioned so as to direct the optical output signal to the reflection hologram and then onto the front surface of the valve.

The reflection hologram of the present invention optically interconnects nonlinear optical devices and, in particular, optically nonlinear optical devices that are operated to function as optical logic NOR gates. A plurality of reflection holograms may be made to interconnect these optical logic gates optically to form any desired optical logic circuit.

A detailed description of reflection holograms is discussed by H. J. Caulfield, editor, in the *Handbook of Optical Holography*, Academic Press, 1979, and by Collier et al. in *Optical Holography*, Academic Press, 1971. In addition, a series of articles edited by T. H. Jeong for making reflection holograms may be found in the *Proceedings of the International Symposium on Display Art Holography*, Holography Workshops, Lake Forest College, Lake Forest, Ill., 1982. Making reflection holograms is generally well known in the art. However, a description of how to make a reflection hologram of the present invention such as reflection hologram 101 for optically interconnecting nonlinear optical devices will be given next.

Depicted in FIG. 5a is an illustrative arrangement for forming and storing optical fringe patterns in a photosensitive material such as a photographic emulsion for optically connecting nonlinear optical device 121 to devices 123 and 129. An unexposed photographic emulsion 500 and a plurality of optically nonlinear optical devices 121 through 129 are affixed in a well-known manner to the parallel surfaces 503 and 504 of optically transparent material 505. For example, the optically transparent material may be silicon glass or, preferably, a high thermal conductivity material such as sapphire. The optically transparent material maintains the nonlinear devices positioned in a two-dimensional array and photographic emulsion 500 in a fixed relative parallel position during both exposure of the photographic emulsion and after processing when the fringe patterns have been permanently stored in the emulsion. The index of refraction of the transparent material is selected to reduce Fresnel reflections. However, as suggested, a sapphire material is preferred because it more evenly distributes the heat generated by the optical signals passing therethrough.

Also included in the recording arrangement are spatial light modulator masks 501 and 502 such as well-known electrically operated magneto-optic arrays that are temporarily affixed to rear surface 111 of the unexposed photographic emulsion and front surface 130 of the device array, respectively. As shown in FIG. 5a, coherent light beam 551 passes through mask 501 along with coherent light beams 552 and 553 through mask 502 to illuminate outside surface 111 of photographic emulsion 500 and outside surface 130 of devices 123 and 129, respectively.

FIG. 5b depicts the derivation of coherent light beams 551 through 553 from a single coherent beam. Coherent light beam 570 from a coherent light source 520 such as a commercially available laser is split into two coherent light beams 551 and 571 by commercially available variable beam splitter 521. One or more light beam directors such as mirrors 522 and 523 are positioned to direct coherent reference beam 551 to illuminate a predetermined area of emulsion 500 designated for reflection subhologram 101. Coherent beam 571 is split into two equal-power coherent object light beams 552 and 553 by another beam splitter 524. In this illustrative embodiment, object beams 552 and 553 have half the optical power of reference beam 551 and are directed to illuminate front surface 130 of respective devices 123 and 129 by one or more light beam directors such a beam splitter 524 and mirror 525. However, the power of the coherent object beams 552 and 553 may be different to vary proportionately the power of interconnecting control light beams 153 and 154, respectively.

As shown in FIG. 5a, reference light beam 551 is directed through a portion of rear surface 111 of the photographic emulsion that is exposed by spatial light modulator mask 501 to illuminate receiving and emitting surface 115 of device 121. Similarly, object beams 552 and 553 are directed through front surface 130 of respective devices 123 and 129 that are exposed by spatial light modulator mask 502 to interfere with reference beam 551 in the photographic emulsion. The difference in distance traveled between coherent reference light beam 551 and each of coherent object light beams 552 and 553 from the coherent light source to the photographic emulsion should be much less than the coherence length of the beams.

To form optical fringe patterns in the emulsion for reflection subhologram 101, mask 501 is electrically operated in a well-known manner to form an opening for coherent reference light beam 551 to enter the rear surface 111 of the emulsion. In addition, mask 502 is also electrically operated to form openings for coherent object light beams 552 and 553 to pass through optically nonlinear devices 123 and 129, respectively. Object beams 552 and 553 pass through respective devices 123 and 129 and enter the photographic emulsion through front surface 130. Reference beam 551 and object beams 552 and 553 approximate plane waves. As previously suggested, the plane wave of beams 552 and 553 diverge a small amount from rear surface 131 of the devices to front surface 110 of emulsion 500. Object beams 552 and 553 interfere with reference beam 551 in the emulsion to form three-dimensional optical interference patterns or, more particularly, well-known Bragg filter optical fringe patterns that are stored in the photographic emulsion. Similarly, each area of the photographic emulsion designated for a particular subhologram is exposed to form a three-dimensional optical fringe pattern in the emulsion associated with the correspondingly positioned device. After each designated area of the photographic emulsion is separately exposed, spatial light modulator masks 501 and 502 are removed. The exposed photographic emulsion is then processed in a well-known manner to permanently store the optical fringe patterns. As shown, the originally stored optical fringe patterns are directly used to optically interconnect devices 121 through 129. However, the originally stored fringe patterns may also be used as a master to replicate copies.

The permanently stored fringe patterns form a plurality of reflection holograms for optically interconnecting devices 121 through 129 in a predetermined manner to perform a desired logic operation. As illustrated in FIG. 1a, interconnecting output light beam 152 illuminates the front surface 110 of reflection subhologram 101 and is the conjugate of coherent reference light beam 551 used to form the fringe pattern. Conjugate light beams propagate in directly opposite directions with respect to each other. In response to interconnecting output beam 152, the optical fringe pattern of reflection subhologram 101 originates interconnecting control beam 154 to device 123 and interconnecting control beam 155 to device 129. These interconnecting control light beams are the conjugates of coherent object light beams 552 and 553, respectively. In effect, the optical fringe pattern of subhologram 101 functions as a set of optical beam splitters and mirrors to split and reflect interconnecting output light beam 152 as interconnecting control light beams 154 and 155 to respective devices 123 and 129. Thus, it should be apparent that the reflection hologram of the present invention may be used in either a "space-variant" or "space-invariant" arrangement as discussed in the Sawchuk article (supra) to interconnect a plurality of optically nonlinear optical devices to form any combinational or sequential logic circuit.

Figure 6:
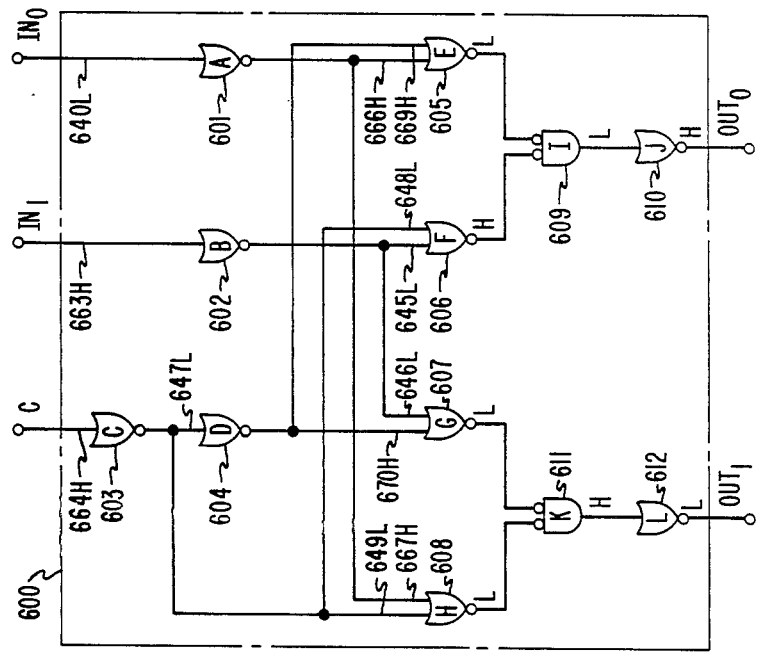
FIG. 6 depicts an illustrative logic diagram of a well-known two-by-two crossbar switch comprised of only NOR gates.

Depicted in FIG. 6 is a logic diagram of an illustrative two-by-two crossbar switch 600 with input terminals $IN_0$ and $IN_1$, respective output terminals $OUT_0$ and $OUT_1$, and control terminal C. This well-known two-by-two combinational logic crossbar switch comprises NOR gates 601 through 612 interconnected as shown. For illustrative purposes, the logic NOR gates are also designated A through L so that they may be arranged on three rows of a four-by-four array and likewise interconnected to form the two-by-two crossbar switch.

Figure 7:
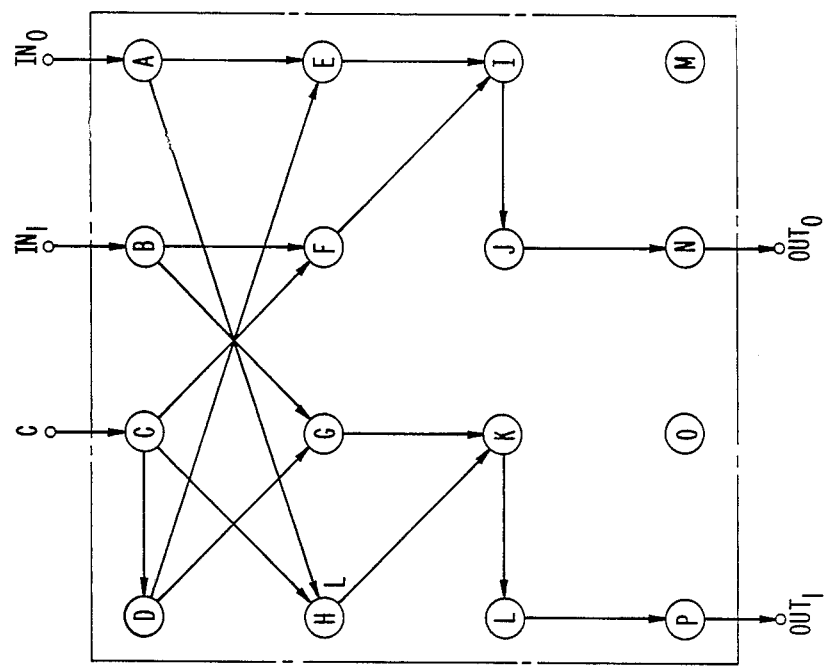
FIG. 7 is a nodal diagram of the crossbar switch of FIG. 6 positioned in a four-by-four array.

Depicted in FIG. 7 is a nodal diagram that illustrates the interconnection of NOR gates 601 through 612 on three rows of a four-by-four array of nodes designated A through P. The nodal diagram also illustrates how a corresponding optical two-by-two crossbar switch may be arranged and interconnected on a four-by-four array of optically nonlinear optical devices. Nodes A through L represent logic gates 601 through 612, respectively. Nodes A through L also represent three rows of a four-by-four optically nonlinear optical device array, and nodes M through P represent the fourth row of the optical device array. The lines not only represent the necessary interconnections of NOR gates 601 through 612 to form a crossbar switch but also the necessary interconnecting light beams from each of the reflection subholograms that are needed to form a corresponding two-by-two optical crossbar switch. Macroscopically, each reflection subhologram in a space variant interconnection arrangement splits and reflects the single interconnecting output light beam from the correspondingly positioned optically nonlinear device into as many control beams as are needed.

As suggested, the two-by-two optical crossbar switch comprises sixteen optically nonlinear optical devices positioned in a four-by-four two-dimensional array and a plurality of reflection subholograms also in a four-by-four two-dimensional array to interconnect the devices as indicated in the nodal diagram of FIG. 7. The optical switch requires two more devices (nodes N and P) than illustrative switch 600 to pass the reflected output beams from the rear surface of elements J and L and out the front surface.

Figure 8:
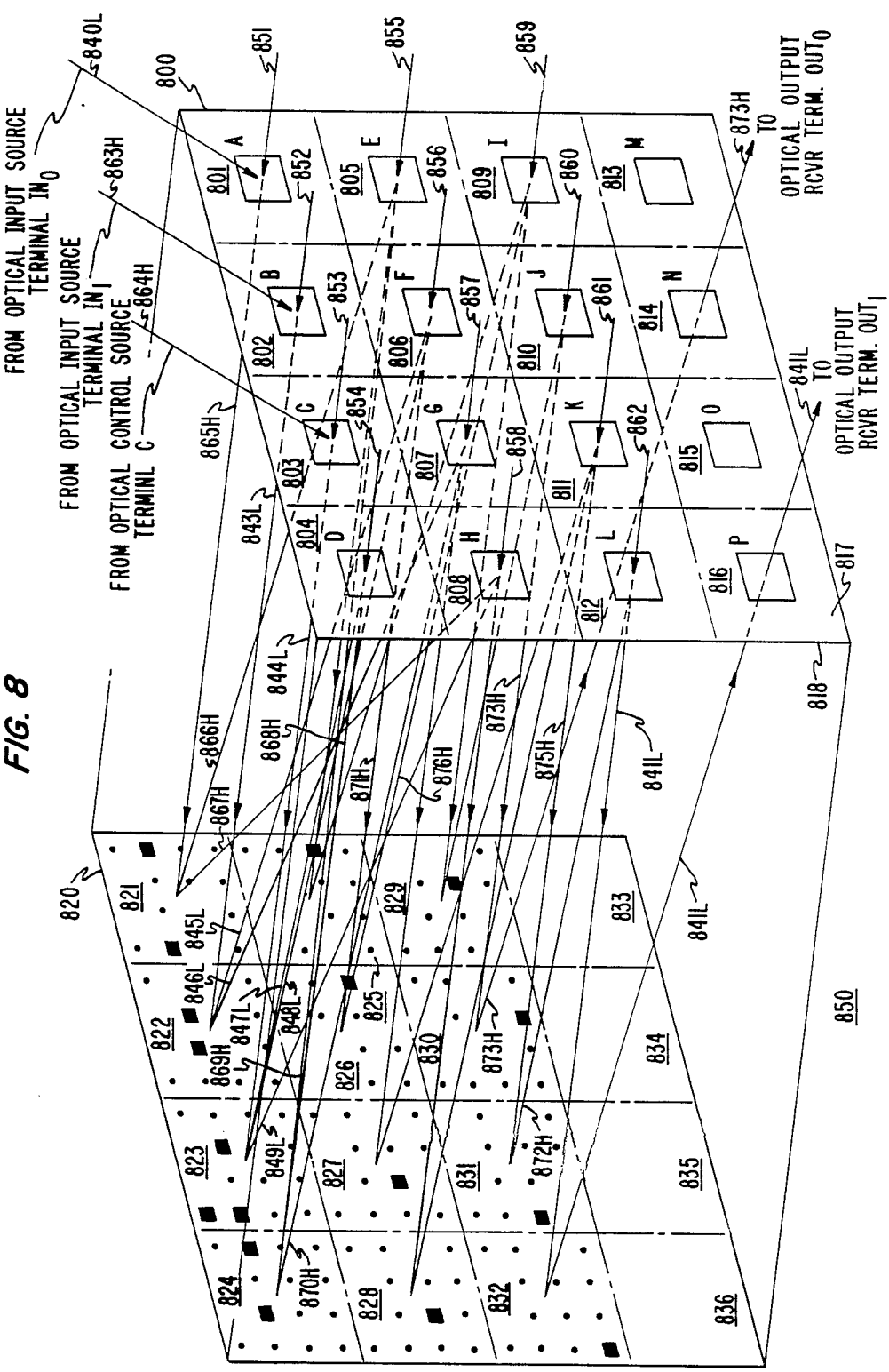
FIG. 8 depicts an illustrative two-by-two optical crossbar switch corresponding to the crossbar switch of FIG. 6.

Depicted in FIG. 8 is an illustrative two-by-two optical crossbar switch 850 comprising a four-by-four array 800 of bistable self electro-optic effect devices (SEEDs) 801 through 816 and a four-by-four array 820 of reflection subholograms 821 through 836 for optically interconnecting the SEED array as indicated in the nodal diagram of FIG. 7. Devices 801 through 816 correspond to nodes A through P, respectively, and are so designated in FIG. 8. Either a coherent or incoherent light source (not shown) illuminates the front surface 817 of SEEDs 801 through 812 with bias light beams 851 through 862, respectively. These optical bias beams cause SEEDs 801 through 812 to function as optical logic NOR gates. Bistable devices 813 through 816 are shielded from the light source and either absorb or pass optical signals depending on the incident power thereof.

Referring to FIGS. 6 through 8, the output signals on the output terminals $OUT_0$ and $OUT_1$ of a two-by-two crossbar switch depend on the logic level of the control signal on the control terminal C and on the logic level of the input signals on the corresponding input terminal $IN_0$ and $IN_1$. In this illustrative embodiment, the switch is in the "crossed state" when a high logic level signal is applied to the control terminal C. As a result, the logic level on input terminal $IN_0$ is switched to output terminal $OUT_1$, and the logic level on input terminal $IN_1$ is switched to output terminal $OUT_0$. When a low logic level is applied to the control terminal C, the switch is in the "bar state", and the logic level on each of the input terminal $IN_0$ and $IN_1$ is switched to the corresponding output terminals $OUT_0$ and $OUT_1$, respectively. This can of course be verified with corresponding crossbar switches 600 and 850 by applying a set of logic level signals to the input and control terminals and tracing the logic levels through the NOR gates of the switches to the output terminals.

As shown in FIG. 8, a low logic level control light beam 840L from optical input source terminal $IN_0$ is applied to optical NOR gate 801, and high logic level control beams 863H and 864H from respective input and control source terminals $IN_1$ and C are applied to respective optical NOR gates 802 and 803. Accordingly, optical crossbar switch 850 is in the "crossed state". As a result, optical NOR gate 810 emits a high logic level interconnecting output light beam 873H to optical output receiver terminal $OUT_0$, and optical NOR gate 812 emits a low logic level interconnecting output light beam 841L to optical output receiver terminal $OUT_1$. In order to pass high logic level interconnecting output light beam 873H from the front surface 817 of SEED array 800, reflection subhologram 830 reflects high logic level interconnecting output beam 873H to SEED 814. Since a bias beam is not incident on any of SEEDs 813 through 816, high logic level interconnecting output beam 873H passes through SEED 814 to output receiver terminal $OUT_1$. Similarly, SEED 816 passes low logic level interconnecting output light beam 841L from reflection subhologram 832 to optical output receiver terminal $OUT_1$.

To verify the logic operation of corresponding two-by-two crossbar switches 600 and 850 depicted in respective FIGS. 6 and 8, the aforementioned combination of input logic level control signals is applied to the corresponding inputs of the two crossbar switches. With respect to optical crossbar switch 850, since bias light beam 851 is incident along with low logic level input control beam 840L on optical NOR gate 801, the bias beam is passed through the gate and emitted as a high logic level interconnecting output beam 865H to reflection subhologram 821. Reflection subhologram 821 splits and reflects output beam 865H as high logic level interconnecting control beams 866H and 867H to respective optical NOR gates 805 and 808.

To minimize the possible confusion created by a large number of intersecting lines in FIG. 8, an array of dots on each of reflection subholograms 821 through 832 represents the relative center position of SEEDs 801 through 816. A shaded box positioned over the relative center position of a optical logic element on a subhologram merely illustrates to what logic element an output beam is reflected. For example, subhologram 821 has two shaded boxes, one over the relative center position of logic element 805 and the other over element 808. Thus, an interconnecting output light beam from logic element 801 is split and reflected to elements 805 and 808.

When a high logic level optical control signal in addition to the optical bias signal is incident on an optical logic NOR gate, the optical NOR gate absorbs most of the incident light as previously described, and a low logic level optical output signal is emitted to the corresponding reflection subhologram. Such is the case with optical NOR gates 802 and 803 emitting respective low logic level interconnecting output beams 843L and 844L when respective high logic level input control beams 863H and 864H are incident thereon. Reflection subhologram 822 splits and reflects interconnecting output light beam 843L as low logic level interconnecting control beams 845L and 846L to respective optical NOR gates 806 and 807. Similarly, reflection subhologram 823 splits and reflects interconnecting output beam 844L as low logic level interconnecting control beams 847L, 848L, and 849L to respective NOR gates 804, 806, and 808.

This combination of crossbar switch input control signals is also illustrated in FIG. 6 when a low logic level input signal 640L from input terminal $IN_0$ is applied to single input NOR gate 601. The single input gate inverts the low level logic input signal and sends high logic level control signals 666H and 667H to an input of respective NOR gates 605 and 608. Applying a high logic level input control signal 663H from input terminal $IN_1$ to single input NOR gate 602, the gate inverts the high logic level signal and sends low logic level control signals 645L and 646L to respective NOR gates 606 and 607. Similarly, applying a high logic level control signal 664H from control terminal C to single input NOR gate 603, the gate sends low logic level control signals 647L, 648L, and 649L to respective NOR gates 604, 606, and 608.

Single input NOR gate 604 inverts low logic level signal 647L and sends high logic level control signals 669H and 670H to an input of respective NOR gates 605 and 607. This is similarly depicted in FIG. 8 with low logic level interconnecting control beam 847L incident on the rear surface 818 of optical NOR gate 804. As a result, the gate passes bias beam 854 to emit high logic level interconnecting output beam 868H to reflection subhologram 824. Reflection subhologram 824 splits and reflects interconnecting output beam 868H as interconnecting control beams 869H and 870H to respective optical NOR gates 805 and 807.

Again, applying a high logic level signal to any input of a NOR gate causes the output signal therefrom to assume a low logic level. This is the case with NOR gates 605, 607, and 608 in FIG. 6 and corresponding optical NOR gates 805, 807, and 808 in FIG. 8. However, applying a low logic level signal to all the inputs of a NOR gate causes the gate output signal to assume a high logic level. As depicted in FIG. 6 with low logic level signals (L) on all of the inputs of NOR gates 606 and 611, the output signals from each assumes a high logic level (H). With a high logic level signal now on an input of NOR gate 609, the output signal assumes a low logic level (L). This is illustrated in FIG. 8 by optical NOR gates 806 and 811 passing respective bias beams 856 and 861 as corresponding high logic level interconnecting output beams 871H and 875H, respectively. Reflection subhologram 826 reflects output beam 871H as a high logic level interconnecting control beam 876H to optical NOR gate 809. Whereas, reflection subhologram 831 reflects interconnecting output beam 875H as a high logic level interconnecting control beam 872H to optical NOR gate 812.

With high logic level interconnecting control beam 872H incident thereon, optical NOR gate 812 absorbs most of the incident light and emits a low logic level interconnecting output beam 841L to reflection subhologram 832. The reflection subhologram reflects interconnecting output beam 841L through unbiased SEED 816 to optical output receiver terminal $OUT_1$. This is illustrated in FIG. 6 by applying a high logic level signal to single input NOR gate 612 whose output signal on terminal $OUT_1$ of the crossbar switch assumes a low logic level. Applying a low logic level signal to single input NOR gate 610 results in a high logic level output signal (H) being present on output terminal $OUT_0$ of the crossbar switch. This is likewise illustrated in FIG. 8 by optical NOR gate 810 passing bias beam 860 as a high logic level interconnecting output beam 873H as previously described. Reflection subhologram 830 then reflects this output beam through unbiased SEED 814 to optical output receiver terminal $OUT_0$.

Briefly summarizing the operation of the crossbar switch in the "crossed state", when a high logic level signal is applied to the control terminal C, the logic level of the signal on each of input terminals $IN_0$ and $IN_1$ is switched to the opposite output terminal $OUT_1$ and $OUT_0$, respectively. Similarly, the operation of crossbar switches 600 and 850 can be readily verified when the switch is in the "bar state". That is, when a low logic level signal is applied to the control terminal C, the logic level of each of the signals on input terminals $IN_0$ and $IN_1$ is switched to the corresponding output terminal $OUT_0$ and $OUT_1$, respectively.

Figure 10:
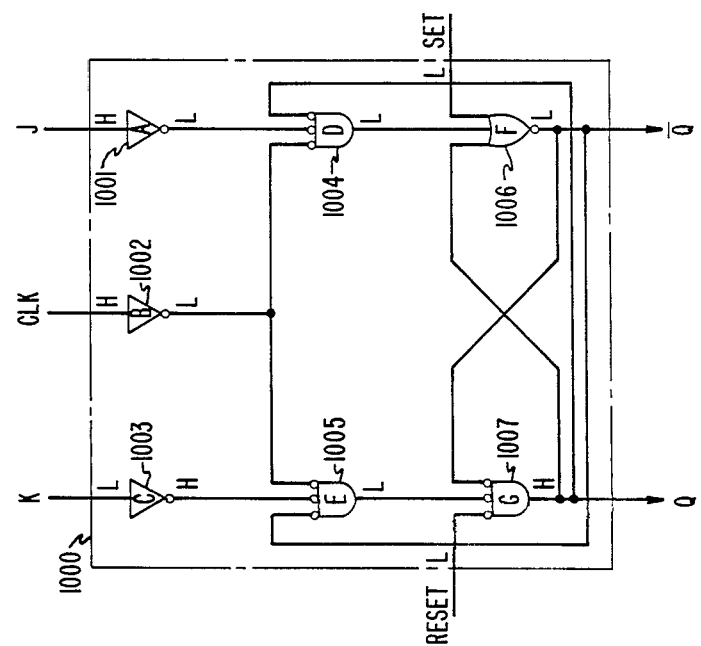
FIG. 10 shows an illustrative logic diagram of a well-known clocked JK flip-flop comprised of only logic NOR gates.

Not only can reflection holograms interconnect optically nonlinear optical devices to form combinational logic circuits such as optical crossbar switches, but an array of reflection subholograms may also be used to interconnect an array of optically nonlinear devices to form any sequential logic circuit. In contrast to a combinational logic circuit, a sequential logic circuit typically includes at least one feedback path for providing various timing and memory functions that are performed, for example, in a digital processor. By way of example, a logic diagram of a well-known clocked JK flip-flop logic circuit 1000 is depicted in FIG. 10. Being a combination of combinational and sequential optical logic circuits, a clocked JK flip-flop logic circuit may also be considered as a very basic digital processor. The flip-flop circuit comprises only logic NOR gates such as 1001 through 1006 interconnected as shown. In contrast to illustrative two-by-two combinational logic switch 600, clocked JK flip-flop circuit 1000 includes four separate feedback paths. In particular, the output of NOR gate 1006 is fed back to one input of NOR gate 1007, and similarly, the output of NOR gate 1007 is fed back to one input of NOR gate 1006. The third feedback path includes feeding back the output signal of NOR gate 1007 to an input of NOR gate 1004, and the last feedback path includes connecting the output of NOR gate 1006 to an input of NOR gate 1005.

Figure 11:
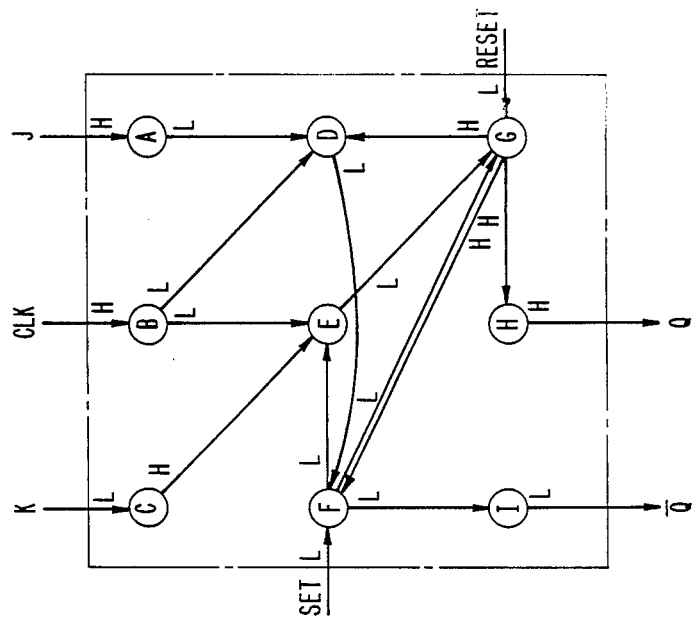
FIG. 11 is a nodal diagram of the clocked JK flip flop of FIG. 10 positioned in a three-by-three array.

In a manner similar to that used for combinational logic circuit 600, clocked JK flip-flop circuit 1000 can be readily reduced to a nodal diagram with corresponding inputs, outputs, and interconnections as shown in FIG. 11. NOR logic gates 1001 through 1007 correspond to nodes A through G, respectively, and have been so designated. With the nodal diagram of FIG. 11, an array of reflection subholograms may be made to optically interconnect a corresponding array of optical logic NOR gates to implement the clocked JK flip-flop circuit 1000.

Figure 12:
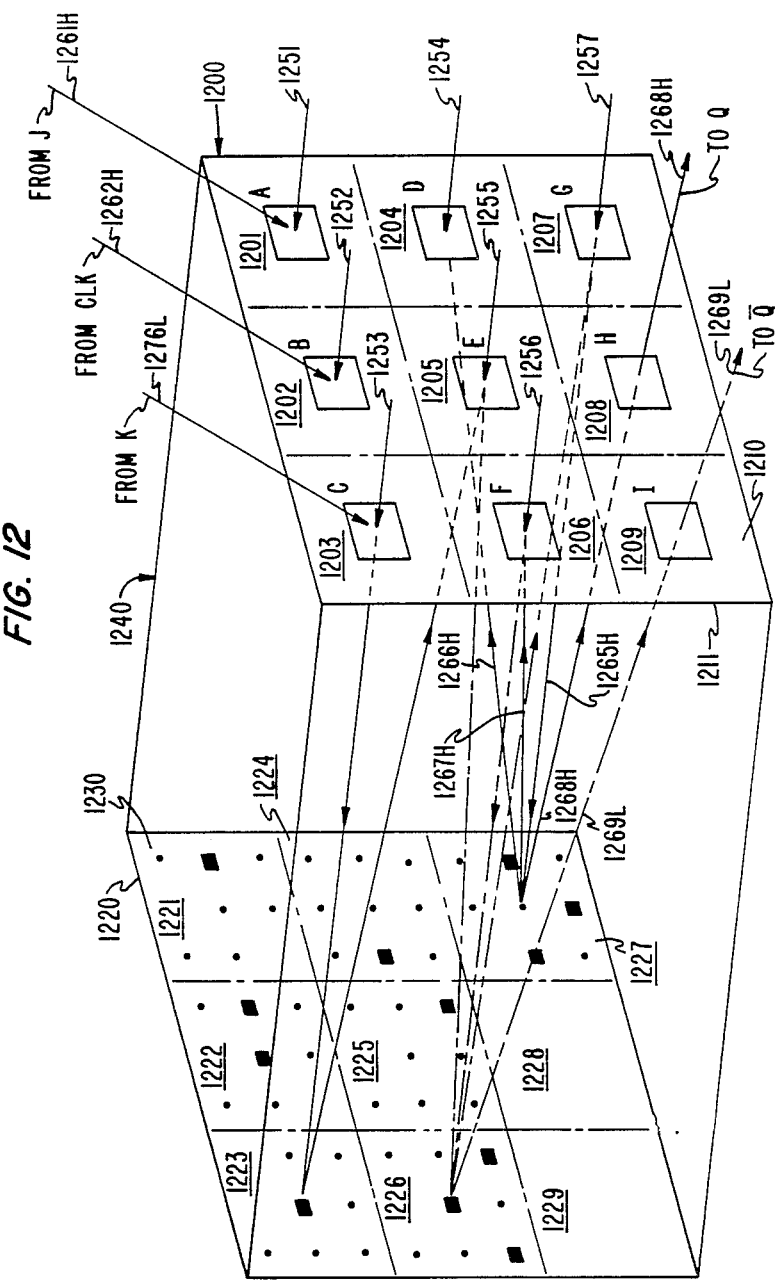
FIG. 12 depicts an illustrative optical sequential logic arrangement comprising optically nonlinear self electro-optic effect devices for implementing an optical version of the clocked JK flip-flop of FIG. 10.

Depicted in FIG. 12 is array 1200 of optically nonlinear optical devices such as SEEDs 1201 through 1209, also respectively designated A through I, for implementing an optical version of clocked JK flip-flop logic circuit 1000. In addition, this optical logic arrangement may also be considered an optical digital processor. Either an incoherent or a coherent light source (not shown) illuminates the front surface 1210 of devices 1201 through 1207 with bias beams 1251 through 1257, respectively. Devices 1208 and 1209 emit output light beams from front surface 1210 and are shielded from the light source, for example, by a planar mirror. Bias beams 1251 through 1257 optically cause respective SEEDs 1201 through 1207 to function as optical logic NOR gates.

Reflection hologram 1220 splits and reflects the interconnecting output light beams from gate array 1200 to interconnect the optical NOR gates to form a clocked JK flip-flop optical logic circuit similar to logic circuit 1000. The reflection hologram comprises a plurality of reflection subholograms 1221 through 1229 each uniquely associated with a correspondingly positioned SEED of logic gate array 1200. Optical transparent material 1240 maintains the front surface 1230 of reflection hologram 1220 and the rear surface 1211 of optical NOR gate array 1200 in a fixed parallel position with the front surface of each reflection subhologram directly facing the correspondingly positioned rear surface of the optical NOR gate.

As previously described, each reflection subhologram is exposed to at least two generally opposing coherent light beams to form an optical fringe pattern that is permanently stored in a well-known manner in a photographic emulsion. After processing, the permanently stored fringe patterns become reflection subhologram 1221 through 1229.

For purposes of illustration, each reflection subhologram has an array of nine dots to indicate the relative center position of each optical NOR gate from and to which optical signals are received and emitted. Again, the shaded box merely illustrates the relative position of the optical NOR gate in array 1200 to which an output beam is reflected.

To verify the predetermined optical interconnections established by the optical fringe pattern of each reflection subhologram, one need only compare the shaded boxes of each reflection subhologram for a particular gate with the outgoing lines from the corresponding node in FIG. 11. The three-by-three array of SEEDs 1201 through 1209 corresponds to the three-by-three array of nodes A through H in FIG. 11, respectively. The shaded box of reflection subhologram 1221 indicates that any interconnecting output beam from optical NOR gate 1201 (node A) will be reflected as an interconnecting control beam to optical NOR gate 1204. This is likewise indicated in the nodal diagram of FIG. 11. The optical interconnections can be similarly verified for reflection subholograms 1222 through 1227.

Having verified the optical interconnections of reflection subholograms 1221 through 1227, a functional comparison of the optical clocked JK flip-flop circuit of FIG. 12 can be readily made with the logic diagram of clocked JK flip-flop circuit 1000 depicted in FIG. 10. This is to verify that the two circuits function in an equivalent manner.

Briefly, the clocked JK flip-flop is functionally identical to the well-known set-reset (SR) flip-flop except when the signals on the J and K terminals are asserted together. In addition, the future output signals of the JK flip-flop are a function of its present state. In this example, the JK flip-flop is designed to simply toggle or change states with the rising-edge of the clock signal should the signals on the J and K terminals be asserted at the same time. The SET and RESET inputs on the JK flip-flop are provided to override the clocked inputs to the circuit. However, to better understand the operation of this circuit, the logic levels on the SET and RESET inputs will remain inactive.

Thus, applying a high logic level signal (H) to input terminals J and CLK and a low logic level signal (L) to input terminal K, the output signals on output terminals Q and Q̄ assume high and low logic levels, respectively. This is similarly illustrated in FIG. 12 by applying high logic level control beams 1261H and 1262H to respective optical NOR gates 1201 and 1202 and a low logic level light beam 1276L to optical NOR 1203. As a result, optical NOR gate 1207 emits a high logic level interconnecting output beam 1265H that reflection subhologram 1227 splits and reflects as high logic level interconnecting feedback control beams 1266H and 1267H and high logic level interconnecting output beam 1268H. Unbiased SEED 1208 passes high logic level output beam 1268H to the Q output terminal.

As shown in FIG. 10, the state of interconnected NOR gates 1006 and 1007 will determine what signals are fed back to NOR gates 1004 and 1005. It is initially assumed that the output signal from NOR gate 1006 is at a high logic level (H) and fed back to NOR gates 1005 and 1007. And it is also assumed that the output signal from NOR gate 1007 is at a low logic level (L) and fed back to NOR gates 1004 and 1006. Since the output signal from logic gate 1003 is at a high logic level (H), the output signal of NOR gate 1005 will be at a low logic level (L) regardless of the output signal fed back from NOR gate 1006 to an input of gate 1005. However, since two input control signals to NOR gate 1004 are at a low logic level (L), the output signal fed back from NOR gate 1007 will determine the logic level of the output signal from NOR gate 1004. First, since the logic level on the SET, and RESET input terminals to NOR gates 1006 and 1007 will force the gates to assume a predetermined output level, these input terminals are assumed to be inactive or, in this case, at a low logic level. Next, the output signal of gate 1004 assumes a high logic level and is applied to the input of NOR gate 1006. This then causes a transition in the states of NOR gates 1006 and 1007 such as to cause a high logic level signal from NOR gate 1006 to be fed back to NOR gate 1005. This finally results in the output signals of NOR gates 1006 and 1007 assuming a low and a high logic level, respectively.

This condition can also be readily verified in FIG. 12. Thus, it can be seen that the optically interconnected clocked JK flip-flop circuit of FIG. 12 functions equivalently to clocked JK flip-flop circuit 1000 depicted in FIG. 10.

It is to be understood that the above-described optical combinational and sequential logic circuits are merely illustrative embodiments of the principals of this invention and that any other optical logic circuit including a more complex optical digital processor may be devised by those skilled in the art without departing from the spirit and scope of the invention. In particular, the arrays of reflection subholograms and optically nonlinear optical devices may be utilized to perform memory functions and parallel processing. Furthermore, the optical input and output signals of each array of logic gates may also be interconnected or cascaded to form any size logic circuit desired.

What is claimed is:

1. An optical logic arrangement comprising:
    a first self electro-optic effect device responsive to a first control light beam for emitting a first output light beam;
    a second self electro-optic effect device responsive to a second control light beam for emitting a second output light beam, said first and second output beams being a nonlinear gain function of said first and second control beams, respectively; and
    a reflection hologram responsive to said first output light beam for originating said second control light beam to said second self electro-optic effect device.

2. The arrangement of claim 1 wherein said arrangement further comprises a third self electro-optic effect device responsive to a third control light beam for emitting a third output light beam, said third output beam being said nonlinear gain function of said third control beam, and wherein said reflection hologram is also responsive to said first output light beam for originating said third control light beam to said third self electro-optic effect device.

3. The arrangement of claim 2 wherein each of said self electro-optic effect devices is also responsive to a bias light beam for performing an optical logic function.

4. The arrangement of claim 1 wherein each of said self electro-optic effect devices is also responsive to a bias light beam for performing an optical logic function.

5. An optical logic arrangement comprising:
    a first self electro-optic effect logic element responsive to a first control light beam for emitting a first output light beam;
    a second self electro-optic effect logic element responsive to a second control light beam for emitting a second output light beam, said first and second output beams being nonlinear gain function of said first and second control beams, respectively; and
    a reflection hologram responsive to said first output light beam for originating said second contol light beam to said second self electro-optic effect logic element.

6. The arrangement of claim 5 wherein said arrangement further comprises first director means for directing said first control light beam to said first electro-optic effect logic element.

7. The arrangement of claim 6 wherein said arrangement further comprises second director means for directing said second output light beam to an optical receiver.

8. The arrangement of claim 5 wherein said arrangement further comprises director means for directing said second output light beam to an optical receiver.

9. The arrangement of claim 5 wherein each of said first and second self electro-optic effect logic elements comprises a multi-quantum well structure connectable to a constant voltage source.

10. The arrangement of claim 9 wherein each of said elements further comprises a feedback resistor connected to said multi-quantum well structure.

11. The arrangement of claim 5 wherein said arrangement further comprises a third self electro-optic effect logic element responsive to a third control light beam for emitting a third output light beam, said third output beam being said nonlinear gain function of said third control beam, and wherein said reflection hologram is also responsive to said first output light beam for originating said third control light beam to sàid third self electro-optic effect logic element.

12. The arrangement of claim 5 wherein said reflection hologram comprises means for reflecting a first predetermined amount of said first output light beam as said second control light beam.

13. The arrangement of claim 12 wherein said arrangement further comprises a third self electro-optic effect logic element responsive to a third control light beam for emitting a third output light beam, said third output beam being said nonlinear gain function of said third control beam, and wherein said reflection hologram is also responsive to said first output light beam for reflecting a second predetermined amount of said first output light beam as said third control light beam to said third self electro-optic effect logic element.

14. The arrangement of claim 13 wherein each of said first, second, and third self electro-optic effect logic elements has a surface for receiving a control light beam thereon and emitting its output light beam therefrom.

15. An optical sequential logic arrangement comprising:
a self electro-optic effect logic effect responsive to a first and a second control light beam for emitting an output light beam, said output beam being a nonlinear gain function of at least one of said first and second control beams; and
a reflection hologram responsive to said output light beam from said self electro-optic effect logic element for reflecting a predetermined amount of said output light beam back to said self electro-optic effect logic element as one of said first and second control light beams.

16. The arrangement of claim 15 wherein said self electro-optic effect logic element has a surface for receiving said first and second control light beams thereon and emitting said output light beam therefrom.

17. An optical sequential logic arrangement comprising:
a first self electro-optic effect logic element responsive to a first and a second control light beam for emitting a first output light beam, said first output beam being a nonlinear gain function of at least one of said first and second control beams;
a second self electro-optic effect logic element responsive to a third control light beam for emitting a second output light beam, said third output beam being said nonlinear gain function of said third control beam;
a first reflection hologram responsive to said first output light beam for originating said third control light beam to said second self electro-optic effect logic element; and
a second reflection hologram responsive to said second output light beam for originating one of said first and second control light beams to said first electro-optic effect logic element.

18. An optical logic arrangement comprising:
a plurality of self electro-optic effect logic elements each responsive to a control light beam for emitting an output light beam, the output beam from at least one of said elements being a nonlinear gain function of the control beam thereto; and
a plurality of reflection holograms each responsive to the output beam received in a predetermined direction from a specified one of said elements for originating a control light beam to at least one other of said elements for establishing an optical interconnection between the specified element and said at least one other element.

19. The arrangement of claim 18 wherein said plurality of self electro-optic effect logic elements are positioned in a first plane and wherein said plurality of reflection holograms are positioned in a second plane.

20. The arrangement of claim 19 wherein said first and second planes are substantially parallel.

21. The arrangement of claim 19 wherein particular of said self electro-optic effect logic elements each has a surface on one side of said first plane for receiving an control light beam thereon and transmitting its output light beam therefrom.

22. The arrangement of claim 21 wherein said arrangement further comprises first director means for directing a control light beam from an optical source received on the other side of said first plane to said self electro-optic effect logic elements.

23. The arrangement of claim 22 wherein said arrangement further comprises second director means for directing an output light beam emitted from the other side of said first plane to an optical receiver.

24. The arrangement of claim 18 wherein each of said self electro-optic effect logic elements comprises a multi-quantum well diode structure and a feedback resistor connectable to a constant voltage source.

25. An optical digital processor comprising:
combinational self electro-optic effect logic means responsive to first and second control light beams for emitting a first output light beam, said first output beam being a nonlinear gain function of at least one of said first and second control beams;
sequential self electro-optic effect logic means responsive to a third control light beam for emitting a second output light beam, said second output beam being said nonlinear gain function of said third control beam;
a first reflection hologram responsive to said first output light beam for originating said third control light beam to said sequential self electro-optic effect logic means; and
a second reflection hologram responsive to said second output light beam for originating at least one of said first and second control light beams to said combinational self electro-optic effect logic means.

26. The processor of claim 25 wherein said combinational self electro-optic effect logic means comprises first and second self electro-optic effect logic elements each having a surface for receiving a control light beam thereon and emitting its output light beam therefrom.

27. The processor of claim 26 wherein said sequential self electro-optic effect logic means comprises a third self electro-optic effect logic element and wherein each of said first, second, and third self electro-optic effect logic elements comprises a multi-quantum well diode structure and a feedback resistor connectable to a constant voltage source.

28. An optical logic arrangement comprising:
a first self electro-optic effect device responsive to a first control light beam for emitting a first output light beam;
a second self electro-optic effect device responsive to a scond control light beam for emitting a second output light beam, said first and second output beams being a nonlinear gain function of said first and second control beams, respectively;
a reflection hologram responsive to said first output beam for originating said second control beam to said second device; and
optically transparent spacer material having oppositely facing first and second surfaces for maintaining the positions of said first and second devices relative to said reflection hologram, said reflection hologram being fixedly positioned on said first surface, said devices being fixedly positioned on said second surface.

29. An optical logic arrangement comprising:
an array of self electro-optic effect devices having oppositely facing first and second surfaces, each of said devices having a fixedly positioned first light-emitting and receiving area of said first surface and a second light-emitting and receiving area of said second surface opposite the first light-emitting and receiving area, each of certain of said devices being responsive to a receipt of a bias light beam at the second light-emitting and receiving area for emitting an output light beam from the first light-emitting and receiving area thereof, each of said certain devices being responsive to a receipt of a control light beam at at least one of the first and second light-emitting and receiving areas for controlling the emitting of the output beam form the first light-emitting and receiving area thereof, the output beam from each of said certain devices being a nonlinear gain function of the control light beam received thereat, each of said certain devices being designated for optical interconnection with at least one other of said devices, each of others of said devices being responsive to a receipt of a control light beam at one of the first and second light-emitting and receiving areas for emitting an output light beam from the other of the first and second light-emitting and receiving areas thereof, an array of reflection holograms including a photosensitive material having a substantially flat surface facing said first surface of said devices, each of said holograms having an optical fringe pattern formed within said photosensitive material and opposite an individual one of the first light-emitting and receiving areas of said first surface of said devices, each of said fringe patterns being effective in response to the output beam from the individual one of said devices opposite the fringe pattern for originating an individual control beam to each of other of said devices designated for optical interconnection with the one device, and an optically transparent spacer material for maintaining said first surface of said devices and said flst surface of said photosensitive material in a fixed relative parallel position, said spacer material having oppositely facing first and second substantially flat parallel surfaces, said flat surface of said photosensitive material being fixedly positioned with said first surface of said spacer material, said first surface of said devices being fixedly positioned with said second surface of said spacer material.

* * * * *